US012764815B2

(12) United States Patent
Gan et al.

(10) Patent No.: US 12,764,815 B2
(45) Date of Patent: Oct. 13, 2026

(54) DATA TRANSMISSION METHOD AND APPARATUS

(71) Applicant: HUAWEI TECHNOLOGIES CO., LTD., Shenzhen (CN)

(72) Inventors: Ming Gan, Shenzhen (CN); Dandan Liang, Shenzhen (CN); Yuchen Guo, Shenzhen (CN); Yunbo Li, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 563 days.

(21) Appl. No.: 18/153,616

(22) Filed: Jan. 12, 2023

(65) Prior Publication Data

US 2023/0189341 A1 Jun. 15, 2023

Related U.S. Application Data

(63) Continuation of application No. PCT/CN2021/106129, filed on Jul. 13, 2021.

(30) Foreign Application Priority Data

Jul. 13, 2020 (CN) ......................... 202010671573.2

(51) Int. Cl.
*H04W 76/15* (2018.01)
*H04W 74/08* (2009.01)
(Continued)

(52) U.S. Cl.
CPC ....... *H04W 76/15* (2018.02); *H04W 74/0816* (2013.01); *H04W 74/0866* (2013.01); *H04W 76/11* (2018.02)

(58) Field of Classification Search
CPC ............. H04W 76/15; H04W 74/0816; H04W 74/0866; H04W 76/11; H04W 84/12; H04W 88/10; H04W 24/02
See application file for complete search history.

(56) References Cited

U.S. PATENT DOCUMENTS

2012/0155447 A1 6/2012 Vermani et al.
2013/0229996 A1 9/2013 Wang et al.
(Continued)

FOREIGN PATENT DOCUMENTS

CN 103348739 A 10/2013
CN 107241798 A 10/2017
(Continued)

OTHER PUBLICATIONS

R4-1701879, Hewlett Packard Enterprise, Further Implications of Wi-Fi Field Measurements for Multi-Node Testing, 3GPP TSG-RAN WG4 Meeting #82, Athens, Greece Feb. 13-17, 2017, 10 pages.
(Continued)

*Primary Examiner* — Sudesh M. Patidar
(74) *Attorney, Agent, or Firm* — HAUPTMAN HAM, LLP

(57) ABSTRACT

A data transmission method includes sending, by a first station in a first multi-link device, a third frame. The third frame indicates the first station enables a mode of sharing a quantity of spatial streams. The mode of sharing the quantity of spatial streams is used for enabling the first station to use the shared spatial streams. A quantity of shared spatial streams is a maximum quantity of shared spatial streams supported by the first multi-link device. The data transmission method also includes receiving, by the first station, a fourth frame. The fourth frame is used for responding to the third frame.

17 Claims, 8 Drawing Sheets

(51) Int. Cl.

| | |
|---|---|
| ***H04W 74/0816*** | (2024.01) |
| ***H04W 76/11*** | (2018.01) |

(56) References Cited

U.S. PATENT DOCUMENTS

| | | | | |
|---|---|---|---|---|
| 2014/0119288 | A1 | 5/2014 | Zhu et al. | |
| 2014/0269544 | A1 | 9/2014 | Zhu et al. | |
| 2016/0014773 | A1* | 1/2016 | Seok | H04W 40/244 370/338 |
| 2017/0257888 | A1 | 9/2017 | Kneckt et al. | |
| 2018/0123656 | A1* | 5/2018 | Alpert | H04B 7/0452 |
| 2018/0302847 | A1* | 10/2018 | Chu | H04W 72/535 |
| 2018/0324596 | A1 | 11/2018 | Xiang et al. | |
| 2019/0045366 | A1 | 2/2019 | Vermani et al. | |
| 2019/0296996 | A1* | 9/2019 | Wee | H04L 43/12 |
| 2019/0327740 | A1 | 10/2019 | Verma et al. | |
| 2019/0335454 | A1 | 10/2019 | Huang et al. | |
| 2020/0037288 | A1 | 1/2020 | Huang et al. | |
| 2020/0112350 | A1 | 4/2020 | Yang et al. | |
| 2020/0137626 | A1* | 4/2020 | Huang | H04L 1/1819 |
| 2020/0154443 | A1 | 5/2020 | Patil et al. | |
| 2020/0162963 | A1 | 5/2020 | Alpert et al. | |
| 2020/0163141 | A1 | 5/2020 | Hsu et al. | |
| 2020/0221545 | A1* | 7/2020 | Stacey | H04W 84/12 |
| 2021/0014911 | A1 | 1/2021 | Patil et al. | |
| 2021/0076437 | A1 | 3/2021 | Kneckt et al. | |
| 2021/0099253 | A1* | 4/2021 | Kim | H04L 1/1607 |
| 2021/0119677 | A1 | 4/2021 | Zhang et al. | |
| 2021/0235309 | A1* | 7/2021 | Noh | H04W 8/22 |
| 2021/0385006 | A1* | 12/2021 | Ryu | H04L 5/0098 |
| 2022/0141871 | A1* | 5/2022 | Abouelseoud | H04W 74/0808 370/329 |

FOREIGN PATENT DOCUMENTS

| | | | |
|---|---|---|---|
| CN | 110832945 | A | 2/2020 |
| CN | 110915146 | A | 3/2020 |
| CN | 111133818 | A | 5/2020 |
| JP | 2011517860 | A | 6/2011 |
| JP | 2020517189 | A | 6/2020 |
| WO | 2018195085 | A1 | 10/2018 |
| WO | 2018208087 | A1 | 11/2018 |
| WO | 2020085824 | A1 | 4/2020 |
| WO | 2020146401 | A1 | 7/2020 |
| WO | 2021228085 | A1 | 11/2021 |

OTHER PUBLICATIONS

Evgeny Khorov et al, Current Status and Directions of IEEE 802.11be, the Future Wi-Fi 7, IEEE 2016, 26 pages.

IEEE Std 802.11-2016, IEEE Standard for Information technology—Telecommunications and information exchange between systems Local and metropolitan area networks-Specific requirements, Part 11: Wireless LAN Medium Access Control (MAC) and Physical Layer (PHY) Specifications, Approved Dec. 7, 2016, total 3534 pages.

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.

International Search Report issued in corresponding International Application No. PCT/2021/106129, dated Sep. 28, 2021, pp. 1-9.

International Search Report issued in corresponding International Application No. PCT/2021/106128, dated Oct. 12, 2021, pp. 1-9.

Chinese Office Action issued in corresponding Chinese Application No. 202010671573.2, dated May 31, 2023, pp. 1-9.

Chinese Office Action issued in corresponding Chinese Application No. 202310794493.X, dated Dec. 15, 2023, pp. 1-8.

Extended European Search Report issued in corresponding European Application No. 21842982.7, dated Nov. 24, 2023, pp. 1-7.

Extended European Search Report issued in corresponding European Application No. 21842007.3, dated Nov. 9, 2023, pp. 1-9.

India Office Action issued in corresponding India Application No. 202337003318, dated Nov. 24, 2023, pp. 1-6.

Yongho Seok (MediaTek), Multi-link Spatial Multiplexing, IEEE 802.11-20/0883r0, Internet URL: https://mentor.ieee.org/802.11/dcn/20/11-20-0883-00-00be-multi-link-spatial-multiplexing.pptx>, Jul. 2, 2020, 16 pages.

Japanese Office Action issued in corresponding Japanese Patent Application No. 2023-501911, dated Dec. 26, 2023, pp. 1-23.

Australian Examination Report No. 1 issued in Australian Application No. 2024259866 dated Dec. 5, 2025.

Edward Au et al. IEEE P802.11 Wireless LANs, Specification Framework for TGbe, IEEE 802.11-19/1262r11, Jul. 11, 2020, total 41 pages.

Korean Office Action issued in KR10-2023-7004865 and mailed Nov. 27, 2025.

Office Action issued in U.S. Appl. No. 18/153,593 dated Dec. 12, 2025.

Japanese Office Action issued in Japanese Application No. 2025-034378, dated Mar. 24, 2026, pp. 1-5.

Office Action issued in U.S. Appl. No. 18/153,593 dated Mar. 26, 2026.

IEEE P802.11be/D0.1 Sep. 2020. Draft Standard for Information technology—Telecommunications and information exchange between systems Local and metropolitan area networks—Specific requirements. Part 11: Wireless LAN Medium Access Control (MAC) and Physical Layer (PHY) Specifications. Amendment 8: Enhancements for extremely high throughput (EHT). total 299 pages.

Australian Office Action issued in corresponding Australian Application No. 2024259866, dated Jul. 3, 2026.

* cited by examiner

DATA TRANSMISSION METHOD AND APPARATUS

CROSS-REFERENCE TO RELATED APPLICATIONS

This application is a continuation of International Application No. PCT/CN2021/106129, filed on Jul. 13, 2021, which claims priority to Chinese Patent Application No. 202010671573.2, filed on Jul. 13, 2020. The disclosures of the aforementioned applications are hereby incorporated by reference in their entireties.

TECHNICAL FIELD

This application relates to the field of communication technologies, and in particular, to a data transmission method and an apparatus.

BACKGROUND

According to the current IEEE 802.11 next-generation wireless fidelity (Wireless Fidelity, Wi-Fi) protocol, an extremely high throughput (Extremely high throughput, EHT) device supports a plurality of streams, a plurality of frequency bands (such as 2.4 GHz, 5 GHz, and 6 GHz frequency bands), cooperation of a plurality of channels in a same frequency band, and other manners, to improve a peak throughput and reduce a service transmission delay. The plurality of frequency bands or the plurality of channels may be collectively referred to as a multilink.

A device that includes a plurality of stations may be referred to as a multi-link device (multi-link device, MLD). Each station in the multi-link device operates on one link. For a multi-link device, how to further improve a throughput of a station is a technical problem that needs to be considered.

SUMMARY

This application provides a data transmission method and an apparatus, to improve a throughput of a station in a multi-link device.

According to a first aspect, a data transmission method is provided. The method includes: A first station in a first multi-link device receives a third frame. The third frame indicates the first station to enable a mode of sharing a quantity of spatial streams. The mode of sharing the quantity of spatial streams is used for enabling the first station to use the shared spatial streams. The quantity of shared spatial streams is a maximum quantity of shared spatial streams supported by the first multi-link device. The first station sends a fourth frame. The fourth frame is used for responding to the third frame.

With reference to the first aspect, in a possible design, after the first station receives the third frame, the method further includes: The first station sends an acknowledge frame of the third frame.

With reference to the first aspect, in a possible design, after the first station sends the fourth frame, the method further includes: The first station receives an acknowledge frame of the fourth frame.

According to a second aspect, a data transmission method is provided. The method includes: A first station in a first multi-link device sends a third frame. The third frame indicates that the first station enables a mode of sharing a quantity of spatial streams. The mode of sharing the quantity of spatial streams is used for enabling the first station to use the shared spatial streams. The quantity of shared spatial streams is a maximum quantity of shared spatial streams supported by the first multi-link device. The first station receives a fourth frame. The fourth frame is used for responding to the third frame.

With reference to the second aspect, in a possible design, the method further includes: The first station receives an acknowledge frame of the third frame.

With reference to the second aspect, in a possible design, the method further includes: The first station sends an acknowledge frame of the fourth frame.

With reference to the first aspect or the second aspect, in a possible design, the method further includes: The first station enables a plurality of spatial streams through frame interaction. A quantity of the plurality of spatial streams is less than or equal to the quantity of shared spatial streams.

With reference to the first aspect or the second aspect, in a possible design, the method further includes: The first station uses, before frame interaction is completed, a spatial stream supported by the first station.

With reference to the first aspect or the second aspect, in a possible design, the method further includes: The first station uses, after frame interaction is completed, the plurality of spatial streams.

With reference to the first aspect or the second aspect, in a possible design, the method further includes: The first station uses, after a frame interaction sequence ends, the spatial stream supported by the first station.

With reference to the first aspect or the second aspect, in a possible design, the method further includes: When any one of preset conditions is met, the first station determines that the frame interaction sequence ends.

The preset condition includes at least one of the following:

The first station receives a seventh frame. A receiving address of the seventh frame is different from an address of the first station, or a sending address of the seventh frame is different from a sending address of an eighth frame received by the first station. The eighth frame is used for starting or establishing a transmit opportunity.

Alternatively, a carrier sense mechanism of the first station indicates that a medium is idle within a preset time period.

Alternatively, the first station receives a physical layer protocol data unit PPDU. The PPDU is determined by the first station as an inter-basic service set inter-BSS PPDU.

Alternatively, the first station receives a multi-user MU PPDU. A basic service set color BSS color in a preamble carried in the MU PPDU is the same as a BSS color of a basic service set associated with the first station, and the preamble carried in the MU PPDU does not include a station identifier that matches the first station.

With reference to the first aspect or the second aspect, in a possible design, the method further includes: The first station receives a fifth frame. The fifth frame indicates the first station to disable the mode of sharing the quantity of spatial streams. The first station sends a sixth frame. The sixth frame is used for responding to the fifth frame.

With reference to the first aspect or the second aspect, in a possible design, after the first station receives the fifth frame, the method further includes: The first station sends an acknowledge frame of the fifth frame.

With reference to the first aspect or the second aspect, in a possible design, after the first station sends the sixth frame, the method further includes: The first station receives an acknowledge frame of the sixth frame.

With reference to the first aspect or the second aspect, in a possible design, the method further includes: The first station sends a fifth frame. The fifth frame indicates the first station to disable the mode of sharing the quantity of spatial streams. The first station receives a sixth frame. The sixth frame is used for responding to the fifth frame.

With reference to the first aspect or the second aspect, in a possible design, the method further includes: The first station sends an eleventh frame. The eleventh frame indicates the maximum quantity of shared spatial streams supported by the first multi-link device.

With reference to the first aspect or the second aspect, in a possible design, the eleventh frame indicates a maximum quantity of shared spatial streams supported by the first multi-link device for each MCS.

With reference to the first aspect or the second aspect, in a possible design, the eleventh frame includes a fifth field. The fifth field indicates a maximum quantity of shared spatial streams for receiving supported by the first multi-link device for each MCS.

With reference to the first aspect or the second aspect, in a possible design, the fifth field is carried in a Supported EHT MCS and NSS Set field of the eleventh frame.

With reference to the first aspect or the second aspect, in a possible design, the eleventh frame includes a sixth field. The sixth field indicates a maximum quantity of shared spatial streams for transmitting supported by the first multi-link device for each MCS.

With reference to the first aspect or the second aspect, in a possible design, the sixth field is carried in the Supported EHT MCS and NSS Set field of the eleventh frame.

With reference to the first aspect or the second aspect, in a possible design, the eleventh frame includes a shared station field. The shared station field indicates a plurality of stations participating in a shared spatial stream.

With reference to the first aspect or the second aspect, in a possible design, the shared station field includes a plurality of link identifier fields.

With reference to the first aspect or the second aspect, in a possible design, the eleventh frame further indicates a maximum quantity of shared spatial streams supported by each station in the first multi-link device.

With reference to the first aspect or the second aspect, in a possible design, the eleventh frame includes an eighth field. The eighth field includes a field of a quantity of spatial streams for receiving, a field of a quantity of spatial streams for transmitting, and a link identifier field.

With reference to the first aspect or the second aspect, in a possible design, the field of the quantity of spatial streams for receiving and the field of the quantity of spatial streams for transmitting are carried in the Supported EHT MCS and NSS Set field of the eleventh frame.

With reference to the first aspect or the second aspect, in a possible design, the eleventh frame is an association request frame or an association response frame.

With reference to the first aspect or the second aspect, in a possible design, the method further includes: The first station sends a delay field. The delay field indicates a delay required for the first station in a first multi-link device to adjust from a supported spatial stream to a shared spatial stream.

According to a third aspect, a data transmission method is provided. The method includes: sending a third frame to a first station in a first multi-link device, where the third frame indicates the first station to enable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and receiving a fourth frame from the first station, where the fourth frame is used for responding to the third frame.

With reference to the third aspect, in a possible design, after the sending a third frame to a first station, the method further includes: receiving an acknowledge frame of the third frame.

With reference to the third aspect, in a possible design, after the receiving a fourth frame from the first station, the method further includes: sending an acknowledge frame of the fourth frame.

According to a fourth aspect, a data transmission method is provided. The method includes: receiving a third frame sent by a first station in a first multi-link device, where the third frame indicates the first station enables a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and sending a fourth frame to the first station, where the fourth frame is used for responding to the third frame.

With reference to the fourth aspect, in a possible design, the method further includes: sending an acknowledge frame of the third frame.

With reference to the fourth aspect, in a possible design, the method further includes: receiving an acknowledge frame of the fourth frame.

With reference to the third aspect or the fourth aspect, in a possible design, the method further includes: sending a fifth frame to the first station, where the fifth frame indicates the first station to disable the mode of sharing the quantity of spatial streams; and receiving a sixth frame from the first station, where the sixth frame is used for responding to the fifth frame.

With reference to the third aspect or the fourth aspect, in a possible design, after the sending a fifth frame to the first station, the method further includes: receiving an acknowledge frame of the fifth frame from the first station.

With reference to the third aspect or the fourth aspect, in a possible design, after the receiving a sixth frame from the first station, the method further includes: sending an acknowledge frame of the sixth frame to the first station.

With reference to the third aspect or the fourth aspect, in a possible design, the method further includes: receiving a fifth frame sent by the first station, where the fifth frame indicates the first station to disable the mode of sharing the quantity of spatial streams; and sending a sixth frame to the first station, where the sixth frame is used for responding to the fifth frame.

With reference to the third aspect or the fourth aspect, in a possible design, the method further includes: receiving an eleventh frame from the first station, where the eleventh frame indicates the maximum quantity of shared spatial streams supported by the first multi-link device.

With reference to the third aspect or the fourth aspect, in a possible design, the eleventh frame indicates a maximum quantity of shared spatial streams supported by the first multi-link device for each MCS.

With reference to the third aspect or the fourth aspect, in a possible design, the eleventh frame includes a fifth field. The fifth field indicates a maximum quantity of shared spatial streams for receiving supported by the first multi-link device for each MCS.

With reference to the third aspect or the fourth aspect, in a possible design, the fifth field is carried in a Supported EHT MCS and NSS Set field of the eleventh frame.

With reference to the third aspect or the fourth aspect, in a possible design, the eleventh frame includes a sixth field. The sixth field indicates a maximum quantity of shared spatial streams for transmitting supported by the first multi-link device for each MCS.

With reference to the third aspect or the fourth aspect, in a possible design, the sixth field is carried in the Supported EHT MCS and NSS Set field of the eleventh frame.

With reference to the third aspect or the fourth aspect, in a possible design, the eleventh frame includes a shared station field. The shared station field indicates a plurality of stations participating in a shared spatial stream.

With reference to the third aspect or the fourth aspect, in a possible design, the shared station field includes a plurality of link identifier fields.

With reference to the third aspect or the fourth aspect, in a possible design, the eleventh frame further indicates a maximum quantity of shared spatial streams supported by each station in the first multi-link device.

With reference to the third aspect or the fourth aspect, in a possible design, the eleventh frame includes an eighth field. The eighth field includes a field of a quantity of spatial streams for receiving, a field of a quantity of spatial streams for transmitting, and a link identifier field.

With reference to the third aspect or the fourth aspect, in a possible design, the field of the quantity of spatial streams for receiving and the field of the quantity of spatial streams for transmitting are carried in the Supported EHT MCS and NSS Set field of the eleventh frame.

With reference to the third aspect or the fourth aspect, in a possible design, the eleventh frame is an association request frame or an association response frame.

With reference to the third aspect or the fourth aspect, in a possible design, the method further includes: receiving a delay field from the first station, where the delay field indicates a delay required for the first station in a first multi-link device to adjust from a supported spatial stream to a shared spatial stream.

According to a fifth aspect, a data transmission method is provided. The method includes: A first station in a first multi-link device receives a fifth frame. The fifth frame indicates the first station to disable a mode of sharing a quantity of spatial streams. The mode of sharing the quantity of spatial streams is used for enabling the first station to use the shared spatial streams. The quantity of shared spatial streams is a maximum quantity of shared spatial streams supported by the first multi-link device. The first station sends a sixth frame. The sixth frame is used for responding to the fifth frame.

In a possible design, after the first station receives the fifth frame, the method further includes: The first station sends an acknowledge frame of the fifth frame.

In a possible design, after the first station sends the sixth frame, the method further includes: The first station receives an acknowledge frame of the sixth frame.

According to a sixth aspect, a data transmission method is provided. The method includes: A first station in a first multi-link device sends a fifth frame. The fifth frame indicates the first station to disable a mode of sharing a quantity of spatial streams. The mode of sharing the quantity of spatial streams is used for enabling the first station to use the shared spatial streams. The quantity of shared spatial streams is a maximum quantity of shared spatial streams supported by the first multi-link device. The first station receives a sixth frame. The sixth frame is used for responding to the fifth frame.

With reference to the fifth aspect or the sixth aspect, in a possible design, the method includes: The first station in the first multi-link device receives a third frame. The third frame indicates the first station to enable the mode of sharing the quantity of spatial streams. The mode of sharing the quantity of spatial streams is used for enabling the first station to use the shared spatial streams. The quantity of shared spatial streams is the maximum quantity of shared spatial streams supported by the first multi-link device. The first station sends a fourth frame. The fourth frame is used for responding to the third frame.

With reference to the fifth aspect or the sixth aspect, in a possible design, after the first station receives the third frame, the method further includes: The first station sends an acknowledge frame of the third frame.

With reference to the fifth aspect or the sixth aspect, in a possible design, after the first station sends the fourth frame, the method further includes: The first station receives an acknowledge frame of the fourth frame.

With reference to the fifth aspect or the sixth aspect, in a possible design, the method further includes: The first station enables a plurality of spatial streams through frame interaction. A quantity of the plurality of spatial streams is less than or equal to the quantity of shared spatial streams.

With reference to the fifth aspect or the sixth aspect, in a possible design, the method further includes: The first station uses, before frame interaction is completed, a spatial stream supported by the first station.

With reference to the fifth aspect or the sixth aspect, in a possible design, the method further includes: The first station uses, after frame interaction is completed, the plurality of spatial streams.

With reference to the fifth aspect or the sixth aspect, in a possible design, the method further includes: After a frame interaction sequence ends, the first station uses the spatial stream supported by the first station.

With reference to the fifth aspect or the sixth aspect, in a possible design, the method further includes: When any one of preset conditions is met, the first station determines that the frame interaction sequence ends.

The preset condition includes at least one of the following:

The first station receives a seventh frame. A receiving address of the seventh frame is different from an address of the first station, or a sending address of the seventh frame is different from a sending address of an eighth frame received by the first station. The eighth frame is used for starting or establishing a transmit opportunity.

Alternatively, a carrier sense mechanism of the first station indicates that a medium is idle within a preset time period.

Alternatively, the first station receives a physical layer protocol data unit PPDU. The PPDU is determined by the first station as an inter-basic service set inter-BSS PPDU.

Alternatively, the first station receives a multi-user MU PPDU. A basic service set color BSS color in a preamble carried in the MU PPDU is the same as a BSS color of a basic service set associated with the first station, and the preamble carried in the MU PPDU does not include a station identifier that matches the first station.

With reference to the fifth aspect or the sixth aspect, in a possible design, the method further includes: The first station sends an eleventh frame. The eleventh frame indicates the maximum quantity of shared spatial streams supported by the first multi-link device.

With reference to the fifth aspect or the sixth aspect, in a possible design, the eleventh frame indicates a maximum quantity of shared spatial streams supported by the first multi-link device for each MCS.

With reference to the fifth aspect or the sixth aspect, in a possible design, the eleventh frame includes a fifth field. The fifth field indicates a maximum quantity of shared spatial streams for receiving supported by the first multi-link device for each MCS.

With reference to the fifth aspect or the sixth aspect, in a possible design, the fifth field is carried in a Supported EHT MCS and NSS Set field of the eleventh frame.

With reference to the fifth aspect or the sixth aspect, in a possible design, the eleventh frame includes a sixth field. The sixth field indicates a maximum quantity of shared spatial streams for transmitting supported by the first multi-link device for each MCS.

With reference to the fifth aspect or the sixth aspect, in a possible design, the sixth field is carried in the Supported EHT MCS and NSS Set field of the eleventh frame.

With reference to the fifth aspect or the sixth aspect, in a possible design, the eleventh frame includes a shared station field. The shared station field indicates a plurality of stations participating in a shared spatial stream.

With reference to the fifth aspect or the sixth aspect, in a possible design, the shared station field includes a plurality of link identifier fields.

With reference to the fifth aspect or the sixth aspect, in a possible design, the eleventh frame further indicates a maximum quantity of shared spatial streams supported by each station in the first multi-link device.

With reference to the fifth aspect or the sixth aspect, in a possible design, the eleventh frame includes an eighth field. The eighth field includes a field of a quantity of spatial streams for receiving, a field of a quantity of spatial streams for transmitting, and a link identifier field.

With reference to the fifth aspect or the sixth aspect, in a possible design, the field of the quantity of spatial streams for receiving and the field of the quantity of spatial streams for transmitting are carried in the Supported EHT MCS and NSS Set field of the eleventh frame.

With reference to the fifth aspect or the sixth aspect, in a possible design, the eleventh frame is an association request frame or an association response frame.

With reference to the fifth aspect or the sixth aspect, in a possible design, the method further includes: The first station sends a delay field. The delay field indicates a delay required for the first station in a first multi-link device to adjust from a supported spatial stream to a shared spatial stream.

According to a seventh aspect, a data transmission method is provided. The method includes: sending a fifth frame to a first station, where the fifth frame indicates the first station to disable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and receiving a sixth frame from the first station, where the sixth frame is used for responding to the fifth frame.

In a possible design, after the sending a fifth frame to the first station, the method further includes: receiving an acknowledge frame of the fifth frame from the first station.

In a possible design, after the receiving a sixth frame from the first station, the method further includes: sending an acknowledge frame of the sixth frame to the first station.

According to an eighth aspect, a data transmission method is provided. The method includes: receiving a fifth frame sent by a first station, where the fifth frame indicates the first station to disable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and sending a sixth frame to the first station, where the sixth frame is used for responding to the fifth frame.

With reference to the seventh aspect or the eighth aspect, in a possible design, the method further includes: sending a third frame to the first station in the first multi-link device, where the third frame indicates the first station to enable the mode of sharing the quantity of spatial streams; and receiving a fourth frame from the first station, where the fourth frame is used for responding to the third frame.

With reference to the seventh aspect or the eighth aspect, in a possible design, after the sending a third frame to the first station, the method further includes: receiving an acknowledge frame of the third frame.

With reference to the seventh aspect or the eighth aspect, in a possible design, after the receiving a fourth frame from the first station, the method further includes: sending an acknowledge frame of the fourth frame.

With reference to the seventh aspect or the eighth aspect, in a possible design, the method further includes: receiving an eleventh frame from the first station, where the eleventh frame indicates the maximum quantity of shared spatial streams supported by the first multi-link device.

With reference to the seventh aspect or the eighth aspect, in a possible design, the eleventh frame indicates a maximum quantity of shared spatial streams supported by the first multi-link device for each MCS.

With reference to the seventh aspect or the eighth aspect, in a possible design, the eleventh frame includes a fifth field. The fifth field indicates a maximum quantity of shared spatial streams for receiving supported by the first multi-link device for each MCS.

With reference to the seventh aspect or the eighth aspect, in a possible design, the fifth field is carried in a Supported EHT MCS and NSS Set field of the eleventh frame.

With reference to the seventh aspect or the eighth aspect, in a possible design, the eleventh frame includes a sixth field. The sixth field indicates a maximum quantity of shared spatial streams for transmitting supported by the first multi-link device for each MCS.

With reference to the seventh aspect or the eighth aspect, in a possible design, the sixth field is carried in the Supported EHT MCS and NSS Set field of the eleventh frame.

With reference to the seventh aspect or the eighth aspect, in a possible design, the eleventh frame includes a shared station field. The shared station field indicates a plurality of stations participating in a shared spatial stream.

With reference to the seventh aspect or the eighth aspect, in a possible design, the shared station field includes a plurality of link identifier fields.

With reference to the seventh aspect or the eighth aspect, in a possible design, the eleventh frame further indicates a maximum quantity of shared spatial streams supported by each station in the first multi-link device.

With reference to the seventh aspect or the eighth aspect, in a possible design, the eleventh frame includes an eighth field. The eighth field includes a field of a quantity of spatial streams for receiving, a field of a quantity of spatial streams for transmitting, and a link identifier field.

With reference to the seventh aspect or the eighth aspect, in a possible design, the field of the quantity of spatial streams for receiving and the field of the quantity of spatial streams for transmitting are carried in the Supported EHT MCS and NSS Set field of the eleventh frame.

With reference to the seventh aspect or the eighth aspect, in a possible design, the eleventh frame is an association request frame or an association response frame.

With reference to the seventh aspect or the eighth aspect, in a possible design, the method further includes: receiving a delay field from the first station, where the delay field indicates a delay required for the first station in a first multi-link device to adjust from a supported spatial stream to a shared spatial stream.

According to a ninth aspect, a data transmission method is provided. The method includes: A first station in a first multi-link device generates an eleventh frame. The eleventh frame indicates a maximum quantity of shared spatial streams supported by the first multi-link device. The first station sends the eleventh frame.

In a possible design, the eleventh frame indicates a maximum quantity of shared spatial streams supported by the first multi-link device for each MCS.

In a possible design, the eleventh frame includes a fifth field. The fifth field indicates a maximum quantity of shared spatial streams for receiving supported by the first multi-link device for each MCS.

In a possible design, the fifth field is carried in a Supported EHT MCS and NSS Set field of the eleventh frame.

In a possible design, the eleventh frame includes a sixth field. The sixth field indicates a maximum quantity of shared spatial streams for transmitting supported by the first multi-link device for each MCS.

In a possible design, the sixth field is carried in the Supported EHT MCS and NSS Set field of the eleventh frame.

In a possible design, the eleventh frame includes a shared station field. The shared station field indicates a plurality of stations participating in a shared spatial stream.

In a possible design, the shared station field includes a plurality of link identifier fields.

In a possible design, the eleventh frame further indicates a maximum quantity of shared spatial streams supported by each station in the first multi-link device.

In a possible design, the eleventh frame includes an eighth field. The eighth field includes a field of a quantity of spatial streams for receiving, a field of a quantity of spatial streams for transmitting, and a link identifier field.

In a possible design, the field of the quantity of spatial streams for receiving and the field of the quantity of spatial streams for transmitting are carried in the Supported EHT MCS and NSS Set field of the eleventh frame.

In a possible design, the eleventh frame is an association request frame or an association response frame.

In a possible design, the method further includes: The first station sends a delay field. The delay field indicates a delay required for the first station in a first multi-link device to adjust from a supported spatial stream to a shared spatial stream.

In a possible design, the method includes: The first station in the first multi-link device receives a third frame. The third frame indicates the first station to enable a mode of sharing a quantity of spatial streams. The mode of sharing the quantity of spatial streams is used for enabling the first station to use the shared spatial streams. The quantity of shared spatial streams is the maximum quantity of shared spatial streams supported by the first multi-link device. The first station sends a fourth frame. The fourth frame is used for responding to the third frame.

In a possible design, after the first station receives the third frame, the method further includes: The first station sends an acknowledge frame of the third frame.

In a possible design, after the first station sends the fourth frame, the method further includes: The first station receives an acknowledge frame of the fourth frame.

In a possible design, the method includes: The first station in the first multi-link device sends a third frame. The third frame indicates the first station enables the mode of sharing the quantity of spatial streams. The mode of sharing the quantity of spatial streams is used for enabling the first station to use the shared spatial streams. The quantity of shared spatial streams is the maximum quantity of shared spatial streams supported by the first multi-link device. The first station receives a fourth frame. The fourth frame is used for responding to the third frame.

In a possible design, the method further includes: The first station enables a plurality of spatial streams through frame interaction. A quantity of the plurality of spatial streams is less than or equal to the quantity of shared spatial streams.

In a possible design, the method further includes: The first station uses, before frame interaction is completed, a spatial stream supported by the first station.

In a possible design, the method further includes: The first station uses, after frame interaction is completed, the plurality of spatial streams.

In a possible design, the method further includes: After a frame interaction sequence ends, the first station uses the spatial stream supported by the first station.

In a possible design, the method further includes: When any one of preset conditions is met, the first station determines that the frame interaction sequence ends.

The preset condition includes at least one of the following:

The first station receives a seventh frame. A receiving address of the seventh frame is different from an address of the first station, or a sending address of the seventh frame is different from a sending address of an eighth frame received by the first station. The eighth frame is used for starting or establishing a transmit opportunity.

Alternatively, a carrier sense mechanism of the first station indicates that a medium is idle within a preset time period.

Alternatively, the first station receives a physical layer protocol data unit PPDU. The PPDU is determined by the first station as an inter-basic service set inter-BSS PPDU.

Alternatively, the first station receives a multi-user MU PPDU. A basic service set color BSS color in a preamble carried in the MU PPDU is the same as a BSS color of a basic service set associated with the first station, and the preamble carried in the MU PPDU does not include a station identifier that matches the first station.

In a possible design, the method further includes: The first station receives a fifth frame. The fifth frame indicates the first station to disable the mode of sharing the quantity of spatial streams. The first station sends a sixth frame. The sixth frame is used for responding to the fifth frame.

In a possible design, after the first station receives the fifth frame, the method further includes: The first station sends an acknowledge frame of the fifth frame.

In a possible design, after the first station sends the sixth frame, the method further includes: The first station receives an acknowledge frame of the sixth frame.

In a possible design, the method further includes: The first station sends a fifth frame. The fifth frame indicates the first station to disable the mode of sharing the quantity of spatial streams. The first station receives a sixth frame. The sixth frame is used for responding to the fifth frame.

According to a tenth aspect, a data transmission method is provided. The method includes: receiving an eleventh frame from a first station in a first multi-link device, where the eleventh frame indicates a maximum quantity of shared spatial streams supported by the first multi-link device; and determining, based on the eleventh frame, the maximum quantity of shared spatial streams supported by the first multi-link device.

In a possible design, the eleventh frame indicates a maximum quantity of shared spatial streams supported by the first multi-link device for each MCS.

In a possible design, the eleventh frame includes a fifth field. The fifth field indicates a maximum quantity of shared spatial streams for receiving supported by the first multi-link device for each MCS.

In a possible design, the fifth field is carried in a Supported EHT MCS and NSS Set field of the eleventh frame.

In a possible design, the eleventh frame includes a sixth field. The sixth field indicates a maximum quantity of shared spatial streams for transmitting supported by the first multi-link device for each MCS.

In a possible design, the sixth field is carried in the Supported EHT MCS and NSS Set field of the eleventh frame.

In a possible design, the eleventh frame includes a shared station field. The shared station field indicates a plurality of stations participating in a shared spatial stream.

In a possible design, the shared station field includes a plurality of link identifier fields.

In a possible design, the eleventh frame further indicates a maximum quantity of shared spatial streams supported by each station in the first multi-link device.

In a possible design, the eleventh frame includes an eighth field. The eighth field includes a field of a quantity of spatial streams for receiving, a field of a quantity of spatial streams for transmitting, and a link identifier field.

In a possible design, the field of the quantity of spatial streams for receiving and the field of the quantity of spatial streams for transmitting are carried in the Supported EHT MCS and NSS Set field of the eleventh frame.

In a possible design, the eleventh frame is an association request frame or an association response frame.

In a possible design, the method further includes: receiving a delay field from the first station, where the delay field indicates a delay required for the first station in a first multi-link device to adjust from a supported spatial stream to a shared spatial stream.

In a possible design, the method further includes: sending a third frame to the first station in the first multi-link device, where the third frame indicates the first station to enable the mode of sharing the quantity of spatial streams, the mode of sharing the quantity of spatial streams is used for enabling the first station to use the shared spatial streams, and the quantity of shared spatial streams is the maximum quantity of shared spatial streams supported by the first multi-link device; and receiving a fourth frame from the first station, where the fourth frame is used for responding to the third frame.

In a possible design, after the sending a third frame to the first station, the method further includes: receiving an acknowledge frame of the third frame.

In a possible design, after the receiving a fourth frame from the first station, the method further includes: sending an acknowledge frame of the fourth frame.

In a possible design, the method further includes: receiving a third frame sent by the first station in the first multi-link device, where the third frame indicates the first station enables the mode of sharing the quantity of spatial streams, the mode of sharing the quantity of spatial streams is used for enabling the first station to use the shared spatial streams, and the quantity of shared spatial streams is the maximum quantity of shared spatial streams supported by the first multi-link device; and sending a fourth frame to the first station, where the fourth frame is used for responding to the third frame.

In a possible design, the method further includes: sending a fifth frame to the first station, where the fifth frame indicates the first station to disable the mode of sharing the quantity of spatial streams; and receiving a sixth frame from the first station, where the sixth frame is used for responding to the fifth frame.

In a possible design, after the sending a fifth frame to the first station, the method further includes: receiving an acknowledge frame of the fifth frame from the first station.

In a possible design, after the receiving a sixth frame from the first station, the method further includes: sending an acknowledge frame of the sixth frame to the first station.

In a possible design, the method further includes: receiving a fifth frame sent by the first station, where the fifth frame indicates the first station to disable the mode of sharing the quantity of spatial streams; and sending a sixth frame to the first station, where the sixth frame is used for responding to the fifth frame.

According to an eleventh aspect, a data transmission method is provided. The method includes: A first station in a first multi-link device enables a plurality of spatial streams through frame interaction. A quantity of the plurality of spatial streams is less than or equal to a maximum quantity of shared spatial streams supported by the first multi-link device.

In a possible design, the method further includes: The first station uses, before frame interaction is completed, a spatial stream supported by the first station.

In a possible design, the method further includes: The first station uses, after frame interaction is completed, the plurality of spatial streams.

In a possible design, the method further includes: After a frame interaction sequence ends, the first station uses the spatial stream supported by the first station.

In a possible design, the method further includes: When any one of preset conditions is met, the first station determines that the frame interaction sequence ends.

The preset condition includes at least one of the following:

The first station receives a seventh frame. A receiving address of the seventh frame is different from an address of the first station, or a sending address of the seventh frame is different from a sending address of an eighth frame received by the first station. The eighth frame is used for starting or establishing a transmit opportunity.

Alternatively, a carrier sense mechanism of the first station indicates that a medium is idle within a preset time period.

Alternatively, the first station receives a physical layer protocol data unit PPDU. The PPDU is determined by the first station as an inter-basic service set inter-BSS PPDU.

Alternatively, the first station receives a multi-user MU PPDU. A basic service set color BSS color in a preamble carried in the MU PPDU is the same as a BSS color of a basic service set associated with the first station, and the preamble carried in the MU PPDU does not include a station identifier that matches the first station.

In a possible design, the method further includes: The first station receives a fifth frame. The fifth frame indicates the first station to disable the mode of sharing the quantity of spatial streams. The first station sends a sixth frame. The sixth frame is used for responding to the fifth frame.

In a possible design, after the first station receives the fifth frame, the method further includes: The first station sends an acknowledge frame of the fifth frame.

In a possible design, after the first station sends the sixth frame, the method further includes: The first station receives an acknowledge frame of the sixth frame.

In a possible design, the method includes: The first station in the first multi-link device receives a third frame. The third frame indicates the first station to enable a mode of sharing a quantity of spatial streams. The mode of sharing the quantity of spatial streams is used for enabling the first station to use the shared spatial streams. The quantity of shared spatial streams is the maximum quantity of shared spatial streams supported by the first multi-link device. The first station sends a fourth frame. The fourth frame is used for responding to the third frame.

In a possible design, after the first station receives the third frame, the method further includes: The first station sends an acknowledge frame of the third frame.

In a possible design, after the first station sends the fourth frame, the method further includes: The first station receives an acknowledge frame of the fourth frame.

In a possible design, the method further includes: The first station in the first multi-link device generates an eleventh frame. The eleventh frame indicates the maximum quantity of shared spatial streams supported by the first multi-link device. The first station sends the eleventh frame.

In a possible design, the eleventh frame indicates a maximum quantity of shared spatial streams supported by the first multi-link device for each MCS.

In a possible design, the eleventh frame includes a fifth field. The fifth field indicates a maximum quantity of shared spatial streams for receiving supported by the first multi-link device for each MCS.

In a possible design, the fifth field is carried in a Supported EHT MCS and NSS Set field of the eleventh frame.

In a possible design, the eleventh frame includes a sixth field. The sixth field indicates a maximum quantity of shared spatial streams for transmitting supported by the first multi-link device for each MCS.

In a possible design, the sixth field is carried in the Supported EHT MCS and NSS Set field of the eleventh frame.

In a possible design, the eleventh frame includes a shared station field. The shared station field indicates a plurality of stations participating in a shared spatial stream.

In a possible design, the shared station field includes a plurality of link identifier fields.

In a possible design, the eleventh frame further indicates a maximum quantity of shared spatial streams supported by each station in the first multi-link device.

In a possible design, the eleventh frame includes an eighth field. The eighth field includes a field of a quantity of spatial streams for receiving, a field of a quantity of spatial streams for transmitting, and a link identifier field.

In a possible design, the field of the quantity of spatial streams for receiving and the field of the quantity of spatial streams for transmitting are carried in the Supported EHT MCS and NSS Set field of the eleventh frame.

In a possible design, the eleventh frame is an association request frame or an association response frame.

In a possible design, the method further includes: The first station sends a delay field. The delay field indicates a delay required for the first station in a first multi-link device to adjust from a supported spatial stream to a shared spatial stream.

According to a twelfth aspect, a communication apparatus is provided, applied to a first station in a first multi-link device. The communication apparatus includes a communication module, configured to receive a third frame, where the third frame indicates the first station to enable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and send a fourth frame, where the fourth frame is used for responding to the third frame.

In a possible design, the communication module is further configured to send an acknowledge frame of the third frame.

In a possible design, the communication module is further configured to receive an acknowledge frame of the fourth frame.

According to a thirteenth aspect, a communication apparatus is provided, applied to a first station in a first multi-link device. The communication apparatus includes a communication module, configured to send a third frame, where the third frame indicates the first station enables a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and receive a fourth frame, where the fourth frame is used for responding to the third frame.

With reference to the twelfth aspect or the thirteenth aspect, in a possible design, the communication apparatus further includes a processing module, configured to enable a plurality of spatial streams through frame interaction. A quantity of the plurality of spatial streams is less than or equal to the quantity of shared spatial streams.

With reference to the twelfth aspect or the thirteenth aspect, in a possible design, the communication module is further configured to: before frame interaction is completed, use a spatial stream supported by the first station.

With reference to the twelfth aspect or the thirteenth aspect, in a possible design, the communication module is further configured to: after frame interaction is completed, use the plurality of spatial streams.

With reference to the twelfth aspect or the thirteenth aspect, in a possible design, the communication module is further configured to: After a frame interaction sequence ends, the first station uses the spatial stream supported by the first station.

With reference to the twelfth aspect or the thirteenth aspect, in a possible design, the processing module is further configured to: when any one of preset conditions is met, determine that the frame interaction sequence ends.

The preset condition includes at least one of the following:

The first station receives a seventh frame. A receiving address of the seventh frame is different from an address of the first station, or a sending address of the seventh frame is different from a sending address of an eighth frame received by the first station. The eighth frame is used for starting or establishing a transmit opportunity.

Alternatively, a carrier sense mechanism of the first station indicates that a medium is idle within a preset time period.

Alternatively, the first station receives a physical layer protocol data unit PPDU. The PPDU is determined by the first station as an inter-basic service set inter-BSS PPDU.

Alternatively, the first station receives a multi-user MU PPDU. A basic service set color BSS color in a preamble carried in the MU PPDU is the same as a BSS color of a basic service set associated with the first station, and the preamble carried in the MU PPDU does not include a station identifier that matches the first station.

With reference to the twelfth aspect or the thirteenth aspect, in a possible design, the communication module is further configured to receive a fifth frame, where the fifth frame indicates the first station to disable the mode of sharing the quantity of spatial streams; and send a sixth frame, where the sixth frame is used for responding to the fifth frame.

With reference to the twelfth aspect or the thirteenth aspect, in a possible design, the communication module is further configured to send an acknowledge frame of the fifth frame.

With reference to the twelfth aspect or the thirteenth aspect, in a possible design, the communication module is further configured to receive an acknowledge frame of the sixth frame.

With reference to the twelfth aspect or the thirteenth aspect, in a possible design, the communication module is further configured to send an eleventh frame, where the eleventh frame further indicates the maximum quantity of shared spatial streams supported by the first multi-link device.

With reference to the twelfth aspect or the thirteenth aspect, in a possible design, the eleventh frame indicates a maximum quantity of shared spatial streams supported by the first multi-link device for each MCS.

With reference to the twelfth aspect or the thirteenth aspect, in a possible design, the eleventh frame includes a fifth field. The fifth field indicates a maximum quantity of shared spatial streams for receiving supported by the first multi-link device for each MCS.

With reference to the twelfth aspect or the thirteenth aspect, in a possible design, the fifth field is carried in a Supported EHT MCS and NSS Set field of the eleventh frame.

With reference to the twelfth aspect or the thirteenth aspect, in a possible design, the eleventh frame includes a sixth field. The sixth field indicates a maximum quantity of shared spatial streams for transmitting supported by the first multi-link device for each MCS.

With reference to the twelfth aspect or the thirteenth aspect, in a possible design, the sixth field is carried in the Supported EHT MCS and NSS Set field of the eleventh frame.

With reference to the twelfth aspect or the thirteenth aspect, in a possible design, the eleventh frame includes a shared station field. The shared station field indicates a plurality of stations participating in a shared spatial stream.

With reference to the twelfth aspect or the thirteenth aspect, in a possible design, the shared station field includes a plurality of link identifier fields.

With reference to the twelfth aspect or the thirteenth aspect, in a possible design, the eleventh frame further indicates a maximum quantity of shared spatial streams supported by each station in the first multi-link device.

With reference to the twelfth aspect or the thirteenth aspect, in a possible design, the eleventh frame includes an eighth field. The eighth field includes a field of a quantity of spatial streams for receiving, a field of a quantity of spatial streams for transmitting, and a link identifier field.

With reference to the twelfth aspect or the thirteenth aspect, in a possible design, the field of the quantity of spatial streams for receiving and the field of the quantity of spatial streams for transmitting are carried in the Supported EHT MCS and NSS Set field of the eleventh frame.

With reference to the twelfth aspect or the thirteenth aspect, in a possible design, the eleventh frame is an association request frame or an association response frame.

With reference to the twelfth aspect or the thirteenth aspect, in a possible design, the communication module is further configured to send a delay field, where the delay field indicates a delay required for the first station in a first multi-link device to adjust from a supported spatial stream to a shared spatial stream.

According to a fourteenth aspect, a communication apparatus is provided. The communication apparatus includes a communication module, configured to send a third frame to a first station in a first multi-link device, where the third frame indicates the first station to enable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and receive a fourth frame from the first station, where the fourth frame is used for responding to the third frame.

In a possible design, the communication module is further configured to receive an acknowledge frame of the third frame.

In a possible design, the communication module is further configured to send an acknowledge frame of the fourth frame.

According to a fifteenth aspect, a communication apparatus is provided. The communication apparatus includes a communication module, configured to receive a third frame sent by a first station in a first multi-link device, where the third frame indicates the first station enables a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and send a fourth frame to the first station, where the fourth frame is used for responding to the third frame.

With reference to the fourteenth aspect or the fifteenth aspect, in a possible design, the communication module is further configured to send a fifth frame to the first station, where the fifth frame indicates the first station to disable the mode of sharing the quantity of spatial streams; and receive a sixth frame from the first station, where the sixth frame is used for responding to the fifth frame.

With reference to the fourteenth aspect or the fifteenth aspect, in a possible design, the communication module is further configured to receive an acknowledge frame of the fifth frame from the first station.

With reference to the fourteenth aspect or the fifteenth aspect, in a possible design, the communication module is further configured to send an acknowledge frame of the sixth frame to the first station.

With reference to the fourteenth aspect or the fifteenth aspect, in a possible design, the communication module is further configured to receive an eleventh frame from the first station, where the eleventh frame indicates the maximum quantity of shared spatial streams supported by the first multi-link device.

With reference to the fourteenth aspect or the fifteenth aspect, in a possible design, the eleventh frame indicates a maximum quantity of shared spatial streams supported by the first multi-link device for each MCS.

With reference to the fourteenth aspect or the fifteenth aspect, in a possible design, the eleventh frame includes a fifth field. The fifth field indicates a maximum quantity of shared spatial streams for receiving supported by the first multi-link device for each MCS.

With reference to the fourteenth aspect or the fifteenth aspect, in a possible design, the fifth field is carried in a Supported EHT MCS and NSS Set field of the eleventh frame.

With reference to the fourteenth aspect or the fifteenth aspect, in a possible design, the eleventh frame includes a sixth field. The sixth field indicates a maximum quantity of shared spatial streams for transmitting supported by the first multi-link device for each MCS.

With reference to the fourteenth aspect or the fifteenth aspect, in a possible design, the sixth field is carried in the Supported EHT MCS and NSS Set field of the eleventh frame.

With reference to the fourteenth aspect or the fifteenth aspect, in a possible design, the eleventh frame includes a shared station field. The shared station field indicates a plurality of stations participating in a shared spatial stream.

With reference to the fourteenth aspect or the fifteenth aspect, in a possible design, the shared station field includes a plurality of link identifier fields.

With reference to the fourteenth aspect or the fifteenth aspect, in a possible design, the eleventh frame further indicates a maximum quantity of shared spatial streams supported by each station in the first multi-link device.

With reference to the fourteenth aspect or the fifteenth aspect, in a possible design, the eleventh frame includes an eighth field. The eighth field includes a field of a quantity of spatial streams for receiving, a field of a quantity of spatial streams for transmitting, and a link identifier field.

With reference to the fourteenth aspect or the fifteenth aspect, in a possible design, the field of the quantity of spatial streams for receiving and the field of the quantity of spatial streams for transmitting are carried in the Supported EHT MCS and NSS Set field of the eleventh frame.

With reference to the fourteenth aspect or the fifteenth aspect, in a possible design, the eleventh frame is an association request frame or an association response frame.

With reference to the fourteenth aspect or the fifteenth aspect, in a possible design, the communication module is further configured to receive a delay field from the first station, where the delay field indicates a delay required for the first station in a first multi-link device to adjust from a supported spatial stream to a shared spatial stream.

According to a sixteenth aspect, a communication apparatus is provided, applied to a first station in a first multi-link device. The communication apparatus includes a communication module, configured to receive a fifth frame, where the fifth frame indicates the first station to disable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and send a sixth frame, where the sixth frame is used for responding to the fifth frame.

According to a seventeenth aspect, a communication apparatus is provided, applied to a first station in a first multi-link device. The communication apparatus includes a communication module, configured to send a fifth frame, where the fifth frame indicates the first station to disable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and receive a sixth frame, where the sixth frame is used for responding to the fifth frame.

According to an eighteenth aspect, a communication apparatus is provided. The communication apparatus includes a communication module, configured to send a fifth frame to a first station, where the fifth frame indicates the first station to disable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and receive a sixth frame from the first station, where the sixth frame is used for responding to the fifth frame.

According to a nineteenth aspect, a communication apparatus is provided. The communication apparatus includes a communication module, configured to receive a fifth frame sent by a first station, where the fifth frame indicates the first station to disable a mode of sharing a quantity of spatial streams, the mode of sharing the quantity of spatial streams is used for enabling the first station to use the shared spatial streams, and the quantity of shared spatial streams is a maximum quantity of shared spatial streams supported by the first multi-link device; and send a sixth frame to the first station, where the sixth frame is used for responding to the fifth frame.

According to a twentieth aspect, a communication apparatus is provided, applied to a first station in a first multi-link device. The communication apparatus includes a processing module and a communication module. The processing module is configured to generate an eleventh frame, where the eleventh frame indicates a maximum quantity of shared spatial streams supported by the first multi-link device. The communication module is configured to send the eleventh frame.

According to a twenty-first aspect, a communication apparatus is provided. The communication apparatus includes a communication module, configured to receive an eleventh frame from a first station in a first multi-link device, where the eleventh frame indicates a maximum quantity of shared spatial streams supported by the first multi-link device; and determine, based on the eleventh frame, the maximum quantity of shared spatial streams supported by the first multi-link device.

According to a twenty-second aspect, a communication apparatus is provided, applied to a first station in a first multi-link device. The communication apparatus includes a processing module, configured to enable a plurality of spatial streams through frame interaction. A quantity of the plurality of spatial streams is less than or equal to a maximum quantity of shared spatial streams supported by the first multi-link device.

According to a twenty-third aspect, a communication apparatus is provided. The communication apparatus includes a processor and a communication interface. The processor and the communication interface are configured to implement any method provided in any one of the first aspect to the seventh aspect. The processor is configured to perform a processing action in a corresponding method, and the communication interface is configured to perform a receiving/sending action in the corresponding method.

According to a twenty-fourth aspect, a computer-readable storage medium is provided. The computer-readable storage medium stores computer instructions. When the computer instructions are run on a computer, the computer is enabled to perform any method provided in any one of the first aspect to the seventh aspect.

According to a twenty-fifth aspect, a computer program product including computer instructions is provided. When the computer instructions are run on a computer, the computer is enabled to perform any method provided in any one of the first aspect to the seventh aspect.

According to a twenty-sixth aspect, a chip is provided, including a processing circuit and a transceiver pin. The processing circuit and the transceiver pin are configured to implement any method provided in any one of the first aspect to the seventh aspect. The processing circuit is configured to perform a processing action in a corresponding method, and the transceiver pin is configured to perform a receiving/sending action in the corresponding method.

It should be noted that for technical effects brought by any design in the twelfth aspect to the twenty-sixth aspect, refer to technical effects brought by corresponding designs in the first aspect to the eleventh aspect. Details are not described herein again.

BRIEF DESCRIPTION OF DRAWINGS

FIG. 2(*b*) is a schematic diagram of a structure of an AP multi-link device and a STA multi-link device that participate in communication according to an embodiment of this application;

FIG. 2(*c*) is a schematic diagram of a structure of an AP multi-link device and a STA multi-link device that participate in communication according to an embodiment of this application;

FIG. 3(*b*) is a schematic diagram of another communication scenario according to an embodiment of this application;

DESCRIPTION OF EMBODIMENTS

Figure 1:
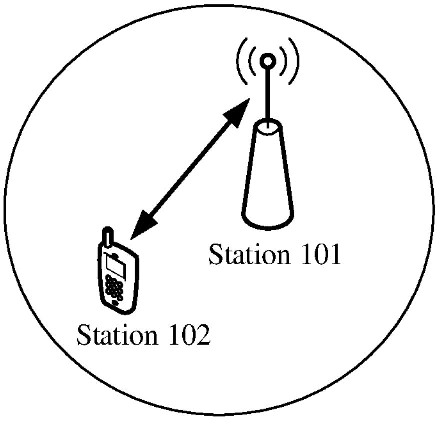
FIG. 1 is a schematic diagram of a wireless local area network according to an embodiment of this application.

The following describes the technical solutions in embodiments of this application with reference to the accompanying drawings in embodiments of this application.

In descriptions of this application, unless otherwise specified, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

To facilitate understanding of technical solutions of this application, the following first briefly describes terms used in this application.

1. Spatial Stream (Spatial Stream)

The spatial stream refers to a data stream in a wireless transmission process. After a multiple-input multiple-output (multiple input multiple output, MIMO) technology is introduced, a plurality of independent spatial streams of data can be transmitted through a multiple-antenna technology. A larger quantity of spatial streams indicates a larger quantity of channels for independently processing data and a higher data transmission rate.

In a MIMO system, a quantity of spatial streams supported by a device is generally less than or equal to a quantity of antennas configured for the device.

In this embodiment of this application, the quantity of spatial streams is a quantity of spatial streams.

2. Request to Send (Request to Send, RTS)/Clear to Send (Clear to Send, CTS) Mechanism The RTS/CTS mechanism is used for resolving a problem of a hidden station, to avoid signal conflict between a plurality of stations.

Before a transmit end sends a data frame, the transmit end first sends an RTS frame in a broadcast manner, to indicate the transmit end to send the data frame to a specified receive end within specified duration. After receiving the RTS frame, the receive end sends a CTS frame in a broadcast manner, to acknowledge the sending of the transmit end.

Another station that receives the RTS frame or the CTS frame does not send a radio frame until the specified duration ends.

3. Carrier Sense Mechanism

The carrier sense mechanism may be classified into a physical carrier sense mechanism and a virtual carrier sense mechanism.

The physical carrier sense mechanism is also referred to as clear channel assessment (clear channel assessment, CCA). In a wireless communication system, before a target device needs to send data on a channel, the target device first receives data on the channel. If the target device does not find that another device sends data on the channel after a given time, the target device starts to send data. If the target device finds that another device sends data, the target device waits for a random period of time and then reattempts the process.

The virtual carrier sense mechanism uses information discovered in 802.11 frames to predict a status of a wireless medium. Generally, virtual carrier sensing is provided by a network allocation vector (network allocation vector, NAV). The NAV is a timer, which is set based on a value of duration in a MAC header of the frame. A value of the NAV decreases as time elapses. If the NAV is not 0, it indicates that the wireless medium is in a busy state. If the NAV is 0, it indicates that the wireless medium is in an idle state. The wireless medium may be a channel, a frequency band, or the like.

4. Basic Service Set (Basic Service Set, BSS)

The BSS is used for describing a group of devices that can communicate with each other in a wireless local area network (wireless local area networks, WLAN). The WLAN may include a plurality of B S Ss. Each BSS has a unique identifier, which is referred to as a basic service set identifier (BSSID).

One BSS may include a plurality of stations (station, STA). A station includes an access point (access point, AP) and a non-access point station (none access point station, non-AP STA). Optionally, one BSS may include one AP and a plurality of non-AP STAs associated with the AP.

5. Intra-Basic Service Set (Intra-BSS) PPDU, and an Inter-Basic Service Set (Inter-BSS) Ppdu For a station, if a BSS to which a PPDU sensed by the station belongs and a BSS associated with the station are a same BSS, or a receive end/transmit end of the PPDU sensed by the station and the station belong to a same BSS, the PPDU is an intra-BSS PPDU. For example, if a BSS color (color)/BSSID in the PPDU sensed by the station is the same as a BSS color/BSSID of the BSS associated with the station, the PPDU is an intra-BSS PPDU.

For a station, if a BSS to which a PPDU sensed by the station belongs and a BSS associated with the station are not a same BSS, or a receive end/transmit end of the PPDU sensed by the station and the station do not belong to a same BSS, the PPDU is an inter-BSS PPDU. For example, if a BSS color/BSSID in the PPDU sensed by the station is different from a BSS color/BSSID of the BSS associated with the station, the PPDU is an inter-BSS PPDU.

The foregoing method for determining, by the station, whether the PPDU is the intra-BSS PPDU or the inter-BSS PPDU is merely an example. For details, refer to the conventional art.

An embodiment of this application provides a data transmission method. The method may be applied to a multi-link device. The multi-link device includes one or more affiliated stations, and the affiliated stations may be logical stations or physical stations. In this embodiment of this application, "the multi-link device includes an affiliated station" may be briefly described as "the multi-link device includes a station".

The affiliated station may be an access point (access point, AP) or a non-access point station (non-access point station, non-AP STA). For ease of description, in this embodiment of this application, a multi-link device whose affiliated station is an AP may be referred to as a multi-link AP or an AP multi-link device or a multi-link AP device, and a multi-link device whose affiliated station is a STA may be referred to as a multi-link STA, a multi-link STA device, or a STA multi-link device.

The multi-link device may implement wireless communication in compliance with the 802.11 system protocol. For example, the 802.11 system protocol may be an 802.11ax protocol, an 802.11be protocol, or a next-generation 802.11 protocol. This is not limited in this embodiment of this application.

The multi-link device may communicate with another device. In this embodiment of this application, the another device may be a multi-link device, or may not be a multi-link device.

For a multi-link device, each affiliated station can operate on a same link, but a plurality of affiliated stations are allowed to operate on the same link. Therefore, in this embodiment of this application, a link identifier may be used to represent a station that operates on a link. If a link has more than one affiliated station, more than one link identifier is required to represent the more than one affiliated station.

Before two multi-link devices communicate with each other, one multi-link device and the other multi-link device may first negotiate or communicate a correspondence between a link identifier and a link (or a station on a link). For example, an AP multi-link device indicates a correspondence between a link identifier and a link (or a station on a link) through a broadcast management frame such as a beacon frame. Therefore, during data transmission, a link (or a station on a link) may be indicated between two multi-link devices through a link identifier, and a large amount of signaling information does not need to be transmitted to indicate the link (or the station on the link). This reduces signaling overheads and improves transmission efficiency.

The following uses an example in which the foregoing one multi-link device is an AP multi-link device, and the foregoing another multi-link device is a STA multi-link device for description.

In an example, when the AP multi-link device establishes a BSS, a management frame (for example, a beacon frame) sent by the AP multi-link device includes a plurality of link identifier information fields. Each link identifier information field may establish a correspondence between a link identifier and a station that operates on a link. Each link identifier information field includes a link identifier, and further includes one or more of a MAC address, an operation set, and a channel quantity. The one or more of the MAC address, the operation set, and the channel quantity may indicate one link.

In another example, in a multi-link association establishment process, the AP multi-link device and the STA multi-link device negotiate a plurality of link identifier information fields. In subsequent communication, the AP multi-link device or the STA multi-link device represents a station in the multi-link device through a link identifier. The link identifier may further represent one or more attributes of a MAC address, a working operation set, and a channel quantity of the station. The MAC address may also be replaced with an association identifier of the AP multi-link device after association. Optionally, if a plurality of stations operate on one link, the link identifier (which is a numeric ID) not only represents an operation set and a channel quantity in which the link is located, but also represents an identifier of a station operating on the link, for example, a MAC address or an AID of the station.

FIG. 1 is a diagram of an application scenario according to an embodiment of this application by using a wireless local area network as an example. The application scenario includes a station 101 and a station 102. The station 101 may communicate with the station 102 through one or more links, to improve a throughput. The station 101 may be a multi-link device, and the station 102 may be a single-link device, a multi-link device, or the like. For example, in a scenario, the station 101 is an AP multi-link device, and the station 102 is a STA multi-link device or a station (for example, a single-link station). In another scenario, the station 101 is a STA multi-link device, and the station 102 is an AP (for example, a single-link AP) or an AP multi-link device. In still another scenario, the station 101 is an AP multi-link device, and the station 102 is an AP multi-link device or an AP. In still another scenario, the station 101 is a STA multi-link device, and the station 102 is a STA multi-link device or a STA. Certainly, the wireless local area network may further include another device. A quantity and a type of devices shown in FIG. 1 are merely an example.

Figure 2A:
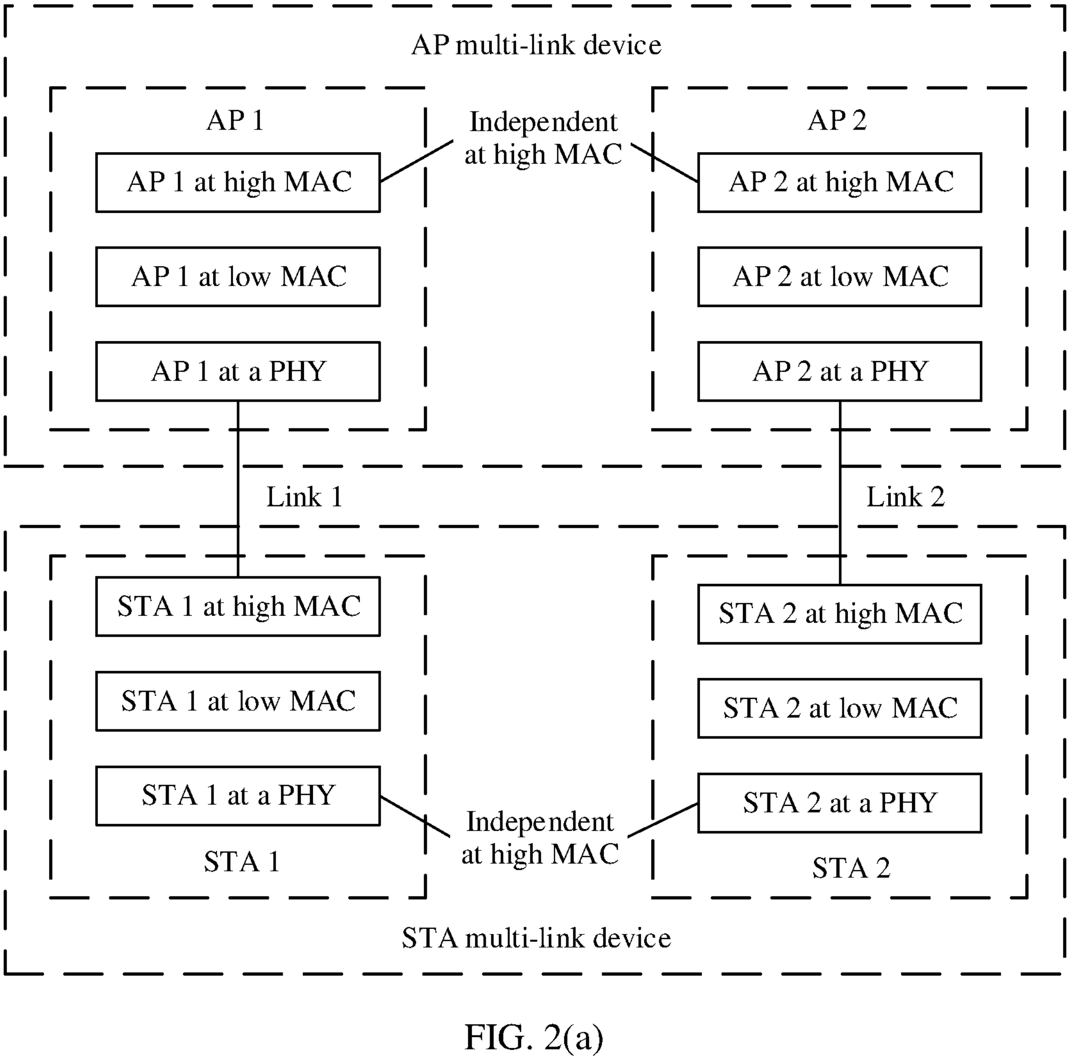
FIG. 2(*a*) is a schematic diagram of a structure of an AP multi-link device and a STA multi-link device that participate in communication according to an embodiment of this application.
Figure 2B:
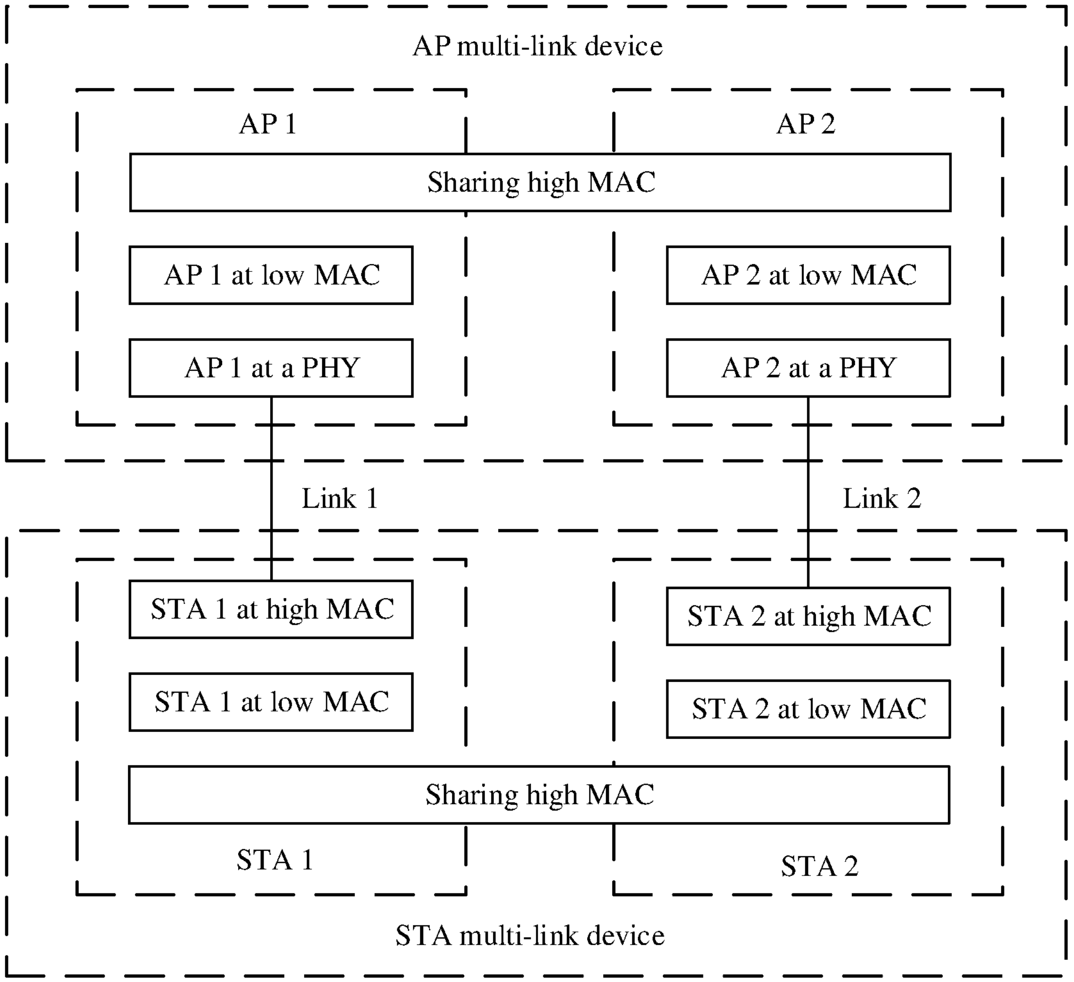
Figure 2C:
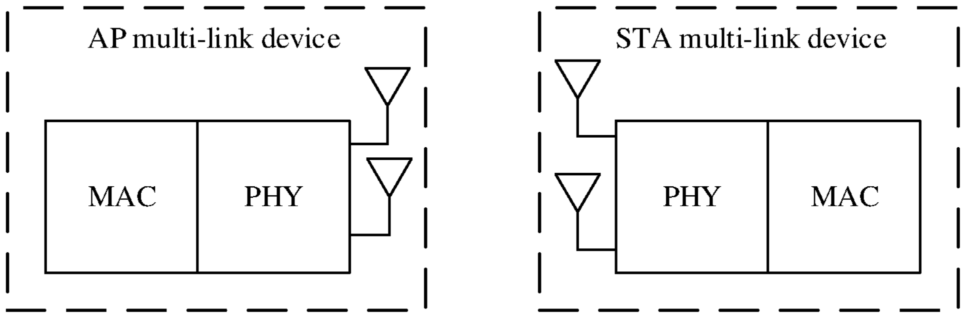

FIG. 2 (*a*) and FIG. 2 (*b*) are a schematic diagram of a structure of an AP multi-link device and a STA multi-link device that participate in communication. The 802.11 standard focuses on an 802.11 physical layer (Physical layer, PHY) part and a medium access control (Media Access Control, MAC) layer part in the AP multi-link device and the STA multi-link device (such as a mobile phone and a notebook computer).

As shown in FIG. 2 (*a*), a plurality of APs included in the AP multi-link device are independent of each other at a low MAC (low MAC) layer and a PHY layer, and are also independent of each other at a high MAC (high MAC) layer. A plurality of STAs included in the STA multi-link device are independent of each other at the low MAC layer and the PHY layer, and are also independent of each other at the high MAC layer.

As shown in FIG. 2 (*b*), a plurality of APs included in the AP multi-link device are independent of each other at a low MAC layer and a PHY layer, and share a high MAC (High MAC) layer. A plurality of STAs included in the STA multi-link device are independent of each other at a low MAC (Low MAC) layer and a PHY layer, and share a high MAC (High MAC) layer.

Certainly, the STA multi-link device may use a structure in which high MAC layers are independent of each other, and the AP multi-link device may use a structure in which a high MAC layer is shared. Alternatively, the STA multi-link device uses a structure in which a high MAC layer is shared, and the AP multi-link device uses a structure in which high MAC layers are independent of each other. For example, the high MAC layer or the low MAC layer may be implemented by a processor in a chip system of the multi-link device, or may be implemented by different processing modules in a chip system.

For example, a plurality of antennas are configured for the multi-link device in this embodiment of this application. A quantity of antennas configured for the multi-link device is not limited in this embodiment of this application. FIG. 2(*c*) shows an example in which an AP multi-link device is configured with two antennas, and a STA multi-link device is configured with two antennas.

In this embodiment of this application, the multi-link device may allow services of a same access type to be transmitted on different links, or even allow a same data packet to be transmitted on different links. The multi-link device may not allow services of a same access type to be transmitted on different links, but allows services of different access types to be transmitted on different links.

Figure 3A:
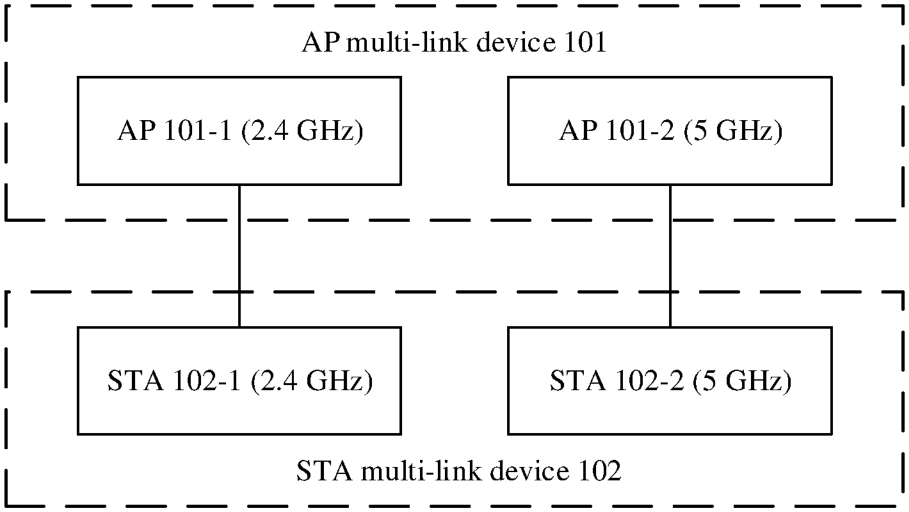
FIG. 3(*a*) is a schematic diagram of a communication scenario according to an embodiment of this application.
Figure 3B:
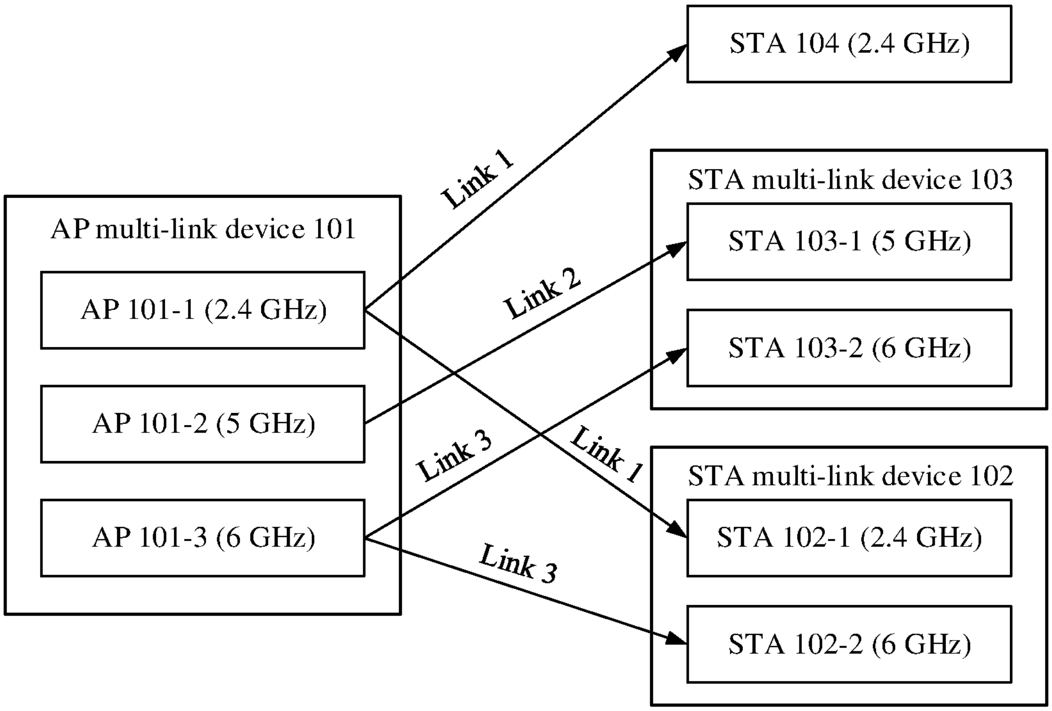

A frequency band on which the multi-link device operates may include but is not limited to sub 1 GHz, 2.4 GHz, 5 GHz, 6 GHz, and a high frequency 60 GHz. FIG. 3 (*a*) and FIG. 3 (*b*) are two schematic diagrams of communication between a multi-link device and another device in a wireless local area network through a plurality of links.

FIG. 3(*a*) shows a scenario in which an AP multi-link device 101 communicates with a STA multi-link device 102. The AP multi-link device 101 includes an affiliated AP 101-1 and an affiliated AP 101-2, the STA multi-link device 102 includes an affiliated STA 102-1 and an affiliated STA 102-2, and the AP multi-link device 101 and the STA multi-link device 102 communicate in parallel through a link 1 and a link 2.

FIG. 3(*b*) shows a scenario in which an AP multi-link device 101 communicates with a STA multi-link device 102, a STA multi-link device 103, and a STA 104. The AP multi-link device 101 includes affiliated AP 101-1 to AP 101-3. The STA multi-link device 102 includes two affiliated STAs: a STA 102-1 and a STA 102-2. The STA multi-link device 103 includes two affiliated STAs: a STA 103-1, a STA 103-2, and a STA 103-3. The STA 104 is a single-link device. The AP multi-link device may separately communicate with the STA multi-link device 102 through a link 1 and a link 3, communicate with the STA multi-link device 103 through a link 2 and the link 3, and communicate with the STA 104 through the link 1. In an example, the STA 104 operates at a 2.4 GHz frequency band. The STA multi-link device 103 includes the STA 103-1 and the STA 103-2. The STA 103-1 operates at a 5 GHz frequency band, and the STA 103-2 operates at a 6 GHz frequency band. The STA multi-link device 102 includes the STA 102-1 and the STA 102-2. The STA 102-1 operates at a 2.4 GHz frequency band, and the STA 102-2 operates at a 6 GHz frequency band. The AP 101-1 operating at the 2.4 GHz frequency band in the AP multi-link device may transmit uplink or downlink data with the STA 104 and the STA 102-2 in the STA multi-link device 102 through the link 1. The AP 101-2 operating at the 5 GHz frequency band in the AP multi-link device may transmit uplink or downlink data with the STA 103-1 operating at the 5 GHz frequency band in the STA multi-link device 103 through the link 2. The AP 101-3 operating at the 6 GHz frequency band in the AP multi-link device 101 may transmit uplink or downlink data with the STA 102-2 operating at the 6 GHz frequency band in the STA multi-link device 102 through the link 3, and may also transmit uplink or downlink data with the STA 103-2 in the STA multi-link device through the link 3.

It should be noted that FIG. 3(*a*) shows only that the AP multi-link device supports two frequency bands, and FIG. 3(*b*) shows only that the AP multi-link device supports three frequency bands (2.4 GHz, 5 GHz, and 6 GHz). Each frequency band corresponds to one link. An example in which the AP multi-link device 101 may operate on one or more of the link 1, the link 2, or the link 3 is used for illustration. On an AP side or a STA side, the link herein may be further understood as a station operating on the link. In actual application, the AP multi-link device and the STA multi-link device may further support more or fewer frequency bands. That is, the AP multi-link device and the STA multi-link device may operate on more or fewer links. This is not limited in this embodiment of this application.

For example, the multi-link device is an apparatus having a wireless communication function. The apparatus may be a device of an entire system, or may be a chip, a processing system, or the like installed in a device of an entire system. The device on which the chip or the processing system is installed may implement a method and a function in this embodiment of this application, under control of the chip or the processing system.

The multi-link STA in this embodiment of this application has a wireless transceiver function, may support the 802.11 series protocols, and may communicate with a multi-link AP, another multi-link STA, or a single-link device. For example, the multi-link STA is any user communication device that allows a user to communicate with an AP and further communicate with a WLAN. For example, the multi-link STA may be user equipment that can access a network, for example, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone, or may be an internet of things node in the internet of things, an in-vehicle communication apparatus in the internet of vehicles, or the like. The multi-link STA may alternatively be a chip or a processing system in the foregoing terminals.

The multi-link AP in this embodiment of this application has a wireless transceiver function, and may support the 802.11 series protocols. For example, the multi-link AP may be a communication entity such as a communication server, a router, a switch, or a bridge, or the multi-link AP may include a macro base station, a micro base station, a relay station, and the like in various forms. Certainly, the multi-link AP may alternatively be a chip and a processing system in the devices in various forms. In this way, the method and the function in this embodiment of this application are implemented.

In addition, the multi-link device may support high-rate and low-delay transmission. With continuous evolution of application scenarios of a wireless local area network, the multi-link device may be further applied to more scenarios. For example, the multi-link device may be a sensor node (for example, a smart water meter, a smart electricity meter, and a smart air detection node) in a smart city, a smart device (for example, a smart camera, a projector, a display screen, a television, a stereo, a refrigerator, and a washing machine) in a smart home, a node in an internet of things, an entertainment terminal (for example, a wearable device such as an AR and a VR), a smart device (for example, a printer or a projector) in a smart office, an internet of vehicles device in an internet of vehicles, and some infrastructures (for example, a vending machine, a self-service navigation console in a supermarket, a self-service cash register, and a self-service ordering machine) in a daily life scenario. Specific forms of the multi-link STA and the multi-link AP are not specially limited in this embodiment of this application, and are merely examples for description herein.

The following describes in detail the data transmission method provided in embodiments of this application with reference to the accompanying drawings of this specification.

Figure 4:
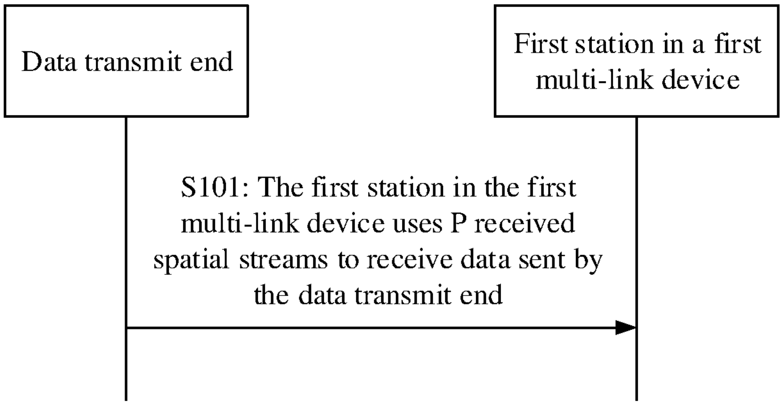
FIG. 4 is a flowchart of a data transmission method according to an embodiment of this application.

FIG. 4 shows a data transmission method according to an embodiment of this application. The method includes the following steps.

S101: A first station in a first multi-link device uses P spatial streams for receiving to receive data sent by a data transmit end.

The first multi-link device includes a plurality of stations. The first station is one of the plurality of stations included in the first multi-link device.

The data transmit end may be a single-link device, or may be a station in a multi-link device, for example, a second station in a second multi-link device below. The second multi-link device is different from the first multi-link device. The second station is one of a plurality of stations included in the second multi-link device. When the second station serves as the data transmit end, the second station and the first station operate on a same link.

For example, the data transmit end is the second station in the second multi-link device. If P is less than or equal to a quantity of spatial streams for transmitting supported by the second station, the second station may send data by using only the spatial streams for transmitting supported by the second station. If P is greater than a quantity of spatial streams supported by the second station, the second station may send data by using the spatial streams for transmitting supported by the second station and a spatial stream supported by another station in the second multi-link device.

The first multi-link device supports M spatial streams for receiving. The first station supports N spatial streams for receiving. M is a positive integer greater than 1, and N is a positive integer less than M.

In a possible design, M is equal to a sum of spatial streams for receiving supported by all shared stations in the first multi-link device. Therefore, the M spatial streams for receiving supported by the first multi-link device include the spatial streams for receiving supported by all the shared stations in the first multi-link device. The shared station can provide a spatial stream of the shared station to another station.

Optionally, all stations in the first multi-link device may be shared stations.

Alternatively, a part of stations in the first multi-link device are shared stations, and the other stations in the first multi-link device are not shared stations. In this case, the first station is a shared station. In addition, a quantity of spatial streams for receiving supported by a non-shared station is not limited by M. That is, the quantity of spatial streams for receiving supported by the non-shared station may be greater than or equal to M, or may be less than or equal to M.

For example, a multi-link device #1 includes a station #1, a station #2, and a station #3. The station #1 supports two spatial streams for receiving, the station #2 supports three spatial streams for receiving, and the station #3 supports four spatial streams for receiving. When the station #1 and the station #2 are shared stations, it may be calculated that M=5. That is, the multi-link device #1 supports five spatial streams.

Optionally, the first multi-link device may determine whether a station in the first multi-link device belongs to a shared station based on a configuration of the first multi-link device, a communication standard, and/or an indication of another device.

For example, the communication standard may predefine that, in a multi-link device, a station operating at a 5 GHz to 6 GHz frequency band is a shared station, and a station operating at a 2.4 GHz frequency band is not a shared station.

For another example, the first multi-link device may send, by sending a radio frame (for example, a management frame, a control frame, or a control field in a data frame), a link identifier corresponding to a shared station to the second multi-link device or a single-link station. In this way, the second multi-link device or the single-link station learns the link identifier corresponding to the shared station in the first multi-link device, and determines the shared station in the first multi-link device. In addition, a frame sending manner may alternatively be broadcast. In this case, a surrounding single-link station or multi-link device can learn the link identifier corresponding to the shared station in the first multi-link device, and determine the shared station in the first multi-link device.

In this embodiment of this application, P is a positive integer greater than N and less than or equal to M. In this case, the P spatial streams for receiving used by the first station are a subset of the M spatial streams for receiving supported by the first multi-link device.

In this embodiment of this application, the first station may use the spatial stream for receiving supported by the first station, or may use a spatial stream for receiving supported by another station. Therefore, a maximum quantity of spatial streams for receiving that can be used by the first station is greater than a quantity of spatial streams for receiving supported by the first station.

Optionally, P is less than or equal to the maximum quantity of spatial streams for receiving that can be used by the first station. The maximum quantity of spatial streams for receiving that can be used by the first station is less than or equal to M.

In a possible design, the P spatial streams for receiving used by the first station include the N spatial streams for receiving supported by the first station and P-N spatial streams for receiving supported by another station in the first multi-link device. In other words, the first station in the first multi-link device not only receives data by using the spatial stream for receiving of the first station, but also may receive data by using the spatial stream for receiving supported by the another station in the first multi-link device.

For example, a multi-link device #1 includes a station #1, a station #2, and a station #3. The station #1 supports two spatial streams for receiving, the station #2 supports three spatial streams for receiving, and the station #3 supports four spatial streams for receiving. In addition, the station #1 and the station #2 are shared stations. In a data transmission process, the station #1 not only may receive data by using the two spatial streams for receiving supported by the station #1, but also may receive data by using one or more of the three spatial streams for receiving supported by the station #2.

In a possible design, the first station may actively receive data by using the P spatial streams for receiving.

Optionally, based on this design, before step S101, the first station needs to send first indication information to the data transmit end. The first indication information indicates the first station to use the P spatial streams for receiving. The first indication information may be carried in a management frame, a control frame, or a control field in a data frame.

In another possible design, the first station may receive data by using the P spatial streams for receiving after being triggered by the data transmit end.

The following describes an implementation in which the first station in the first multi-link device was passively triggered to use of the P spatial streams for receiving.

Implementation 1: The first station in the first multi-link device receives a first frame sent by the data transmit end. The first station in the first multi-link device sends a second frame to the data transmit end.

The first frame indicates a station that is in the first multi-link device and that receives the first frame to receive data by using the P spatial streams for receiving. Optionally, the first frame includes a first field. The first field indicates a specific value of P. The first field may have another name, for example, a field of a quantity of spatial streams. This is not limited in this embodiment of this application.

The second frame is used for responding to the first frame, for example, an acknowledge (Ack) frame. Optionally, the second frame indicates that the first station agrees or refuses to use the P spatial streams for receiving. Further, when the second frame indicates that the first station refuses to use the P spatial streams for receiving, the second frame may further indicate A recommended and spatial streams for receiving. A is not equal to P, and A is a positive integer.

Implementation 2: The first station in the first multi-link device enables (enable) the P spatial streams for receiving after receiving a start frame of frame exchange (frame exchange). In this case, P is equal to M.

Optionally, the start frame of frame exchange may be an RTS frame. In other words, the data transmit end may trigger, by sending the RTS frame to the first station, the first station to enable the P spatial streams for receiving. Then, the first station sends a CTS frame to the data transmit end. After completing an RTS-CTS mechanism, the first station may receive data by using the P spatial streams for receiving.

Optionally, the start frame of frame interaction may be a trigger frame. The trigger frame is used for triggering a station to send an uplink PPDU or a single-user PPDU.

Optionally, the trigger frame used as the start frame of frame interaction needs to meet the following condition.

Condition 1-1: The trigger frame is sent in a form of a single spatial stream.

Condition 1-2: The trigger frame is from an associated AP. Alternatively, if the AP associated with the station corresponds to a non-transmitted (Non-transmitted) BSSID in a multi-BSSID set and supports a control frame sent by a transmitted (transmitted) BSSID in the multi-BSSID set, the trigger frame is from an AP of the transmitted BSSID in the BSSID set.

Condition 1-3: The trigger frame is a multi-user request-to-send (multi-user request to send, MU-RTS) trigger frame, a buffer status report poll (buffer status report poll, BSRP) frame, or a bandwidth query report poll (bandwidth query report poll) trigger frame. In addition, the trigger frame includes a user information field. A value of an AID12 field of the user information field is the same as 12 least significant bits of an AID of the first station.

The condition 1-1 to the condition 1-3 are merely examples. This is not limited in this embodiment of this application.

The first station opens, in a short interframe space (short inter frame space, SIFS) after a start frame of response frame interaction, more than one spatial stream for receiving to receive data based on a capability of the spatial stream, for example, a Supported EHT MCS Set field and an operating mode (operating mode change notification information or operating mode indication information).

Implementation 3: When the first station in the first multi-link device is in a mode of sharing spatial streams, the first station in the first multi-link device enables the P spatial streams for receiving after receiving a start frame of frame exchange. In this case, P is equal to M.

The mode of sharing the quantity of spatial streams is used for enabling a station in the multi-link device to use a spatial stream of another station. That is, when the first station is in the mode of sharing the quantity of spatial streams, the first station may use the spatial stream supported by the another station in the first multi-link device.

Correspondingly, when the first station is not in the mode of sharing the quantity of spatial streams, the first station cannot use the spatial stream supported by the another station in the first multi-link device. In this way, when the first station is not in the mode of sharing the quantity of spatial streams, the first station enables the N spatial streams for receiving supported by the first station after receiving the start frame of frame exchange.

In a possible design, a trigger negotiation procedure in which the first station in the first multi-link device enables the mode of sharing the quantity of spatial streams is as follows: The first station in the first multi-link device receives a third frame sent by the data transmit end; and then the first station in the first multi-link device sends a fourth frame to the data transmit end. The third frame indicates a station that receives the third frame to enable the mode of sharing the quantity of spatial streams. The fourth frame is used for responding to the third frame.

In another possible design, a trigger negotiation procedure in which the first station in the first multi-link device enables the mode of sharing the quantity of spatial streams is as follows: The first station in the first multi-link device receives a third frame sent by the data transmit end; and the first station in the first multi-link device sends an acknowledge frame to the data transmit end. Then, the first station in the first multi-link device sends a fourth frame to the data transmit end, and the first station in the first multi-link device receives an acknowledge frame sent by the data transmit end. The third frame indicates a station that receives the third frame to enable the mode of sharing the quantity of spatial streams. The fourth frame is used for responding to the third frame.

Optionally, the third frame further includes a second field. The second field indicates a quantity of spatial streams for receiving that need to be used by the first station.

Optionally, the third frame further includes a seventh field. The seventh field indicates a quantity X of spatial streams for receiving that need to be used by the first station after the first station exits the mode of sharing the quantity of spatial streams or determines, when a preset condition is met, that a frame exchange sequence ends, where 1=<X≤N.

Optionally, the fourth frame further includes a third field. The third field indicates a quantity of spatial streams for receiving that can be currently used by the first station. That is, the third field indicates a value of P.

Optionally, the fourth frame further includes a delay field. The delay field indicates a delay required for the first station in a first multi-link device to adjust from spatial streams for receiving that are currently used to the P spatial streams for receiving.

Optionally, the fourth frame further includes a tenth field. The tenth field indicates a quantity of spatial streams for receiving that is recommended by the first station to be used after the first station exits the mode of sharing the quantity of spatial streams or determines, when a preset condition is met, that a frame exchange sequence ends.

In a possible design, a trigger negotiation procedure in which the first station in the first multi-link device disables the mode of sharing the quantity of spatial streams is as follows: The first station in the first multi-link device receives a fifth frame sent by the data transmit end; and then the first station in the first multi-link device sends a sixth frame to the data transmit end. The fifth frame indicates a station that receives the fifth frame to disable the mode of sharing the quantity of spatial streams. The sixth frame is used for responding to the fifth frame.

In another possible design, a trigger negotiation procedure in which the first station in the first multi-link device disables the mode of sharing the quantity of spatial streams is as follows: The first station in the first multi-link device receives a fifth frame sent by the data transmit end; and the first station in the first multi-link device sends an acknowledge frame to the data transmit end. Then, the first station in the first multi-link device sends a sixth frame to the data transmit end, and the first station in the first multi-link device receives an acknowledge frame sent by the data transmit end. The fifth frame indicates a station that receives the fifth frame to disable the mode of sharing the quantity of spatial streams. The sixth frame is used for responding to the fifth frame.

Optionally, the third frame and the fifth frame may be applied to radio frames of a same type. The radio frame includes an indication field. The indication field indicates whether the radio frame is the third frame or the fifth frame.

In the foregoing description, "enabling the mode of sharing the quantity of spatial streams" may be replaced with "entering the mode of sharing the quantity of spatial streams", and "disabling the mode of sharing the quantity of spatial streams" may be replaced with "exiting the mode of sharing the quantity of spatial streams".

It may be understood that the mode of sharing the quantity of spatial streams may have another name, for example, a sharing mode of a quantity of spatial streams, a sharing mode of spatial streams, or a sharing mode. This is not limited in this embodiment of this application.

Based on the technical solution shown in FIG. 4, compared with the conventional art in which the first station can receive data by using only a spatial stream for receiving supported by the first station, according to the technical solution provided in this application, the first station can receive data by using a spatial stream for receiving supported by another station in the first multi-link device. In other words, compared with the conventional art, in the technical solution of this application, the first station can receive data by using more spatial streams for receiving. Because a quantity of spatial streams for receiving is positively correlated with a data throughput, the technical solution of this application can improve a data throughput of the first station.

In this way, in a scenario in which the first station is required to have a high throughput, the first station may receive data by using the P spatial streams for receiving. In a scenario in which the first station is not required to have a high throughput, the first station in the first multi-link device may receive data by using only a spatial stream for receiving supported by the first station.

Figure 5:
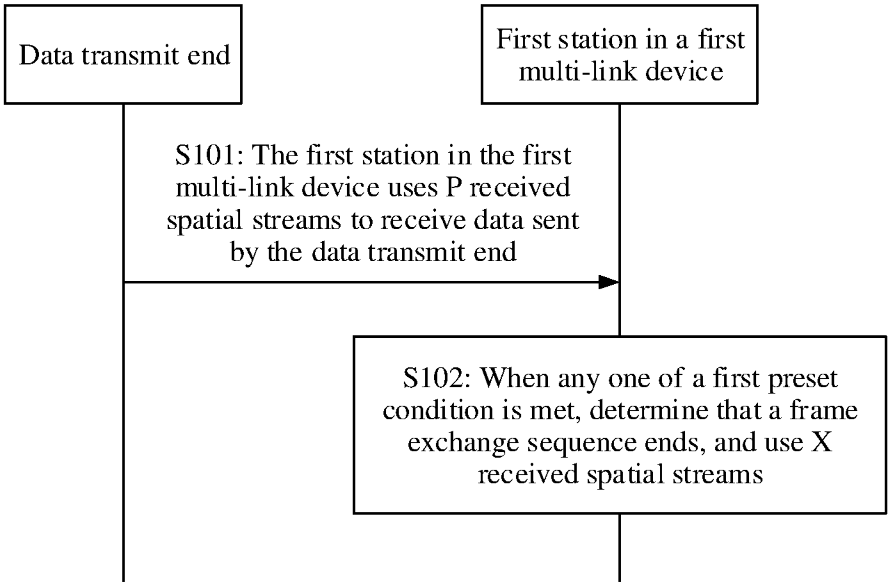
FIG. 5 is a flowchart of another data transmission method according to an embodiment of this application.

Optionally, based on the solution shown in FIG. 4, as shown in FIG. 5, after step S101, a data transmission method may further include step S102.

S102: When any one of preset conditions is met, a first station in a first multi-link device determines that a frame exchange sequence ends, and uses X spatial streams for receiving.

X is a positive integer greater than or equal to 1 and less than or equal to N. The X spatial streams for receiving are a subset of N spatial streams for receiving supported by the first station.

In a possible design, X may be 1 or N by default in a communication standard, and no additional signaling is required to indicate a value of X.

In another possible design, a data transmit end may indicate a value of X to the first station. For example, the data transmit end indicates the value of X by using the seventh field in the third frame.

In other words, when any one of the preset conditions is met, the first station adjusts the originally used P spatial streams for receiving back to the X spatial streams for receiving.

Optionally, the preset condition includes at least one of the following:

Condition 2-1: The first station receives a seventh frame. A receiving address of the seventh frame is different from an address of the first station, or a sending address of the seventh frame is different from a sending address of an eighth frame. The eighth frame is used for starting or establishing a transmit opportunity (transmission opportunity, TXOP) between the first station and the data transmit end.

Condition 2-2: a carrier sense mechanism of the first station indicates that a medium is idle within a preset time period. The medium may have another name, for example, a medium, a frequency band, or a channel. This is not limited herein. For example, the preset time period may be a transport point coordination function interframe space (transport point coordination function interframe space, TxPIFS).

Condition 2-3: The first station receives a physical layer protocol data unit (physical layer protocol data unit, PPDU). The PPDU is determined by the first station as an inter-BSS PPDU.

Condition 2-4: The first station receives a multi-user (multi user, MU) PPDU. A BSS color in a receive vector (RXVECTOR) parameter carried in the MU PPDU is the same as a BSS color of a BSS associated with the first station, and there is no station identifier that matches the first station in the RXVECTOR parameter carried in the MU PPDU. In other words, a BSS color in a preamble of the MU PPDU is the same as the BSS color of the BSS associated with the first station, and there is no station identifier that matches the first station in the preamble of the MU PPDU.

Based on the conditions 2 to 4, before the first station receives the MU PPDU, a value of a basic service set color disable (BSS Color Disable) field in a management frame recently received by the first station is 0.

Based on the technical solution shown in FIG. 5, when any one of the foregoing preset conditions is met, it indicates that the first station in the first multi-link device completes frame sequence exchange with the data transmit end. Therefore, the first station in the first multi-link device stops using a spatial stream for receiving supported by another station in the first multi-link device, so that the another station in the first multi-link device can perform normal communication by using the spatial stream for receiving of the another station.

Figure 6:
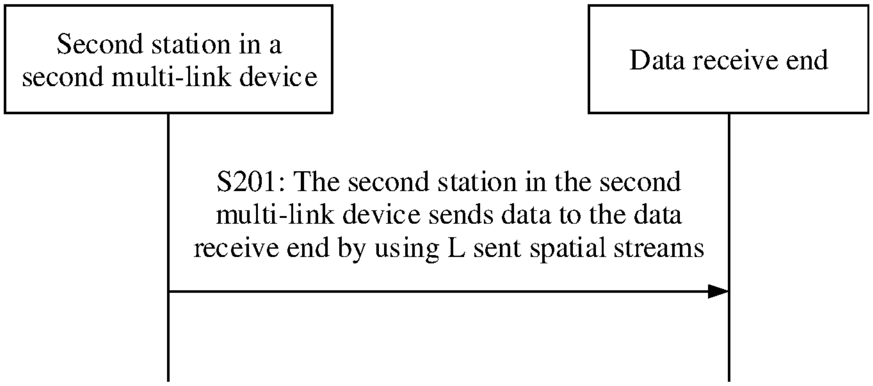
FIG. 6 is a flowchart of another data transmission method according to an embodiment of this application.

FIG. 6 shows a data transmission method according to an embodiment of this application. The method includes the following steps.

S201: A second station in a second multi-link device sends data to a data receive end by using L spatial streams for transmitting.

The second multi-link device includes a plurality of stations. The second station is one of the plurality of stations included in the second multi-link device. The data receive end may be a single-link device, or may be a station in a multi-link device, for example, the first station in the first multi-link device in the foregoing description.

For example, the data receive end is the first station in the first multi-link device. If L is less than or equal to N, the first station may receive data by using only a spatial stream for receiving supported by the first station. If L is greater than N, the first station may receive data by using a spatial stream for receiving supported by the first station and a spatial stream for receiving supported by another station in the first multi-link device.

The second multi-link device supports Q spatial streams for transmitting. The second station in the second multi-link device supports K spatial streams for transmitting. Q is a positive integer greater than 1, and K is a positive integer less than Q.

In a possible design, Q is equal to a sum of spatial streams for transmitting supported by all shared stations in the second multi-link device. Therefore, the Q spatial streams supported by the second multi-link device include the spatial streams for transmitting supported by all the shared stations in the second multi-link device. The shared station can provide a spatial stream of the shared station to another station.

Optionally, all stations in the second multi-link device may be shared stations.

Alternatively, a part of stations in the second multi-link device are shared stations, and the other stations in the second multi-link device are not shared stations. In this case, the second station is a shared station. In addition, a quantity of spatial streams for receiving supported by a non-shared station is not limited by Q. That is, the quantity of spatial streams for receiving supported by the non-shared station may be greater than or equal to Q, or may be less than or equal to Q.

Optionally, the second multi-link device may determine whether a station in the second multi-link device belongs to a shared station based on a configuration of the second multi-link device, a communication standard, and/or an indication of another device.

For example, the communication standard may predefine that, in a multi-link device, a station operating at a 5 GHz to 6 GHz frequency band is a shared station, and a station operating at a 2.4 GHz frequency band is not a shared station.

In this embodiment of this application, L is a positive integer greater than K and less than or equal to Q. In this case, the L spatial streams for transmitting used by the second station are a subset of the Q spatial streams for transmitting supported by the second multi-link device.

In this embodiment of this application, the second station may use the spatial stream for transmitting supported by the second station, or may use a spatial stream for transmitting supported by another station. Therefore, a maximum quantity of spatial streams for transmitting that can be used by the second station is greater than a quantity of spatial streams for transmitting supported by the second station.

Optionally, L is less than or equal to the maximum quantity of spatial streams for transmitting that can be used by the second station. The maximum quantity of spatial streams that can be used by the second station is less than or equal to Q.

In a possible design, the L spatial streams for transmitting used by the second station include the K spatial streams for transmitting supported by the second station and L-K spatial streams for transmitting supported by another station in the second multi-link device. In other words, the second station in the second multi-link device not only sends data by using the spatial stream for transmitting of the second station, but also sends data by using the spatial stream for transmitting supported by the another station in the second multi-link device.

In a possible implementation, the second station may actively send data by using the L spatial streams for transmitting. For example, the second station may determine a quantity of spatial streams for transmitting based on factors such as a link status of the second multi-link device and/or a throughput requirement of to-be-sent data.

For example, when a channel status corresponding to the second station in the second multi-link device is good (for example, channel quality is greater than or equal to a first preset value), and a channel status of a link corresponding to a third station in the second multi-link device is poor (for example, channel quality is less than the first preset value), the second station may send data by using a spatial stream for transmitting supported by the third station in the second multi-link device, to fully utilize a spatial resource and improve a throughput of the second station. The third station may be one or more of other stations in the second multi-link device other than the second station.

For example, when the throughput requirement of the to-be-sent data of the second station is high (for example, the throughput requirement of the to-be-sent data is greater than or equal to a second preset value), the second station may send data by using the L spatial streams for transmitting. When the throughput requirement of the to-be-sent data of the second station is low (for example, the throughput requirement of the to-be-sent data is less than the second preset value), the second station sends data by using the K spatial streams for transmitting.

Optionally, the second station may determine a value of L based on information of spatial stream for receiving related to the data receive end.

For example, the data receive end is a single-link device. When a quantity of spatial streams for receiving supported by the single-link device is greater than a quantity of spatial streams for transmitting supported by the second station, and the quantity of spatial streams for receiving supported by the single-link device is less than or equal to a quantity of spatial streams for transmitting supported by the second multi-link device, a value of L may be less than or equal to the quantity of spatial streams for receiving supported by the single-link device. Alternatively, if the quantity of spatial streams for receiving supported by the single-link device is greater than the quantity of spatial streams for transmitting supported by the second station, and the quantity of spatial streams for receiving supported by the single-link device is greater than the quantity of spatial streams for transmitting supported by the second multi-link device, a value of L may be less than or equal to the quantity of spatial streams for transmitting supported by the second multi-link device.

For example, it is assumed that the second multi-link device supports 10 spatial streams for transmitting, the second station supports two spatial streams for transmitting, and the single-link device supports three spatial streams for receiving, the second station may determine that the value of L is 3.

For example, the data receive end is a station in a peer multi-link device (for example, the first station in the first multi-link device in the foregoing description). When a quantity of spatial streams for receiving supported by the peer multi-link device is greater than a quantity of spatial streams for transmitting supported by the second station, and the quantity of spatial streams for receiving supported by the peer multi-link device is less than or equal to a quantity of spatial streams for transmitting supported by the second multi-link device, a value of L may be less than or equal to the quantity of spatial streams for receiving supported by the peer multi-link device. Alternatively, if the quantity of spatial streams for receiving supported by the peer multi-link device is greater than the quantity of spatial streams for transmitting supported by the second station, and the quantity of spatial streams for receiving supported by the peer multi-link device is greater than the quantity of spatial streams for transmitting supported by the second multi-link device, a value of L may be less than or equal to the quantity of spatial streams for transmitting supported by the second multi-link device.

In another possible implementation, the second station may send data by using the L spatial streams for transmitting after being triggered by the data receive end.

In a possible design, a trigger procedure may include the following step: The second station receives a ninth frame sent by a data transmit end. Then, the second station sends a tenth frame to the data transmit end.

The ninth frame indicates the second station to send data by using the L spatial streams for transmitting. Optionally, the ninth frame includes a fourth field. The fourth field indicates a value of L.

The tenth frame is used for responding to the ninth frame. Optionally, the tenth frame may indicate to agree or refuse the second station to use the L spatial streams for transmitting.

Optionally, the tenth frame may be an acknowledge frame.

In another possible design, a trigger procedure may include the following steps: The second station receives a ninth frame sent by the data transmit end, and the second station sends an acknowledge frame to the data transmit end. Then, the second station sends a tenth frame to the data transmit end, and the second station receives an acknowledge frame sent by the data transmit end.

Optionally, before step S201, the second station may send second indication information to the data receive end. The second indication information indicates a quantity of spatial streams for transmitting used by the second station.

Based on the technical solution shown in FIG. 6, compared with the conventional art in which the second station can send data by using only a spatial stream for transmitting supported by the second station, according to the technical solution provided in this application, the second station can send data by using a spatial stream for transmitting supported by another station in the second multi-link device. In other words, compared with the conventional art, in the technical solution of this application, the second station can send data by using more spatial streams for transmitting. Because a quantity of spatial streams for transmitting is positively correlated with a data throughput, the technical solution of this application can improve a data throughput of the second station.

In this way, in a scenario in which the second station is required to have a high throughput, the second station may send data by using the L spatial streams for transmitting. In a scenario in which the second station is not required to have a high throughput, the second station in the second multi-link device may send data by using only a spatial stream for transmitting supported by the second station.

The following describes the technical solutions shown in FIG. 4 and FIG. 6 by using an example with reference to an actual application scenario.

Figure 7:
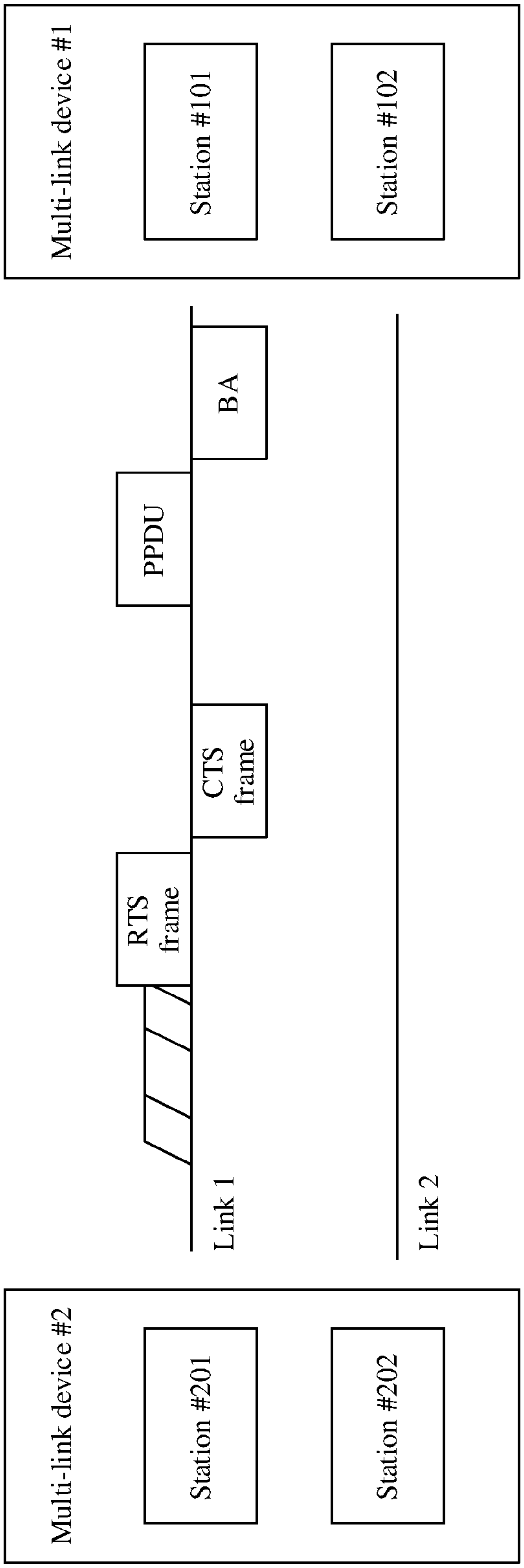
FIG. 7 is a schematic diagram of a communication scenario according to an embodiment of this application.

As shown in FIG. 7, a multi-link device #1 includes a station #101 and a station #102, and a multi-link device #2 includes a station #201 and a station #202. The station #101 and the station #201 both operate on a link 1, and the station #102 and the station #202 both operate on a link 2. The multi-link device #1 supports four spatial streams for receiving, and the station #101 and the station #102 both support two spatial streams for receiving. The multi-link device #2 supports four spatial streams for transmitting, and the station #201 and the station #202 both support two spatial streams for transmitting. The multi-link device #2 determines that channel quality of the link 1 is good, and determines that channel quality of the link 2 is poor. Therefore, the station #201 in the multi-link device #2 sends an RTS frame to the station #101 in the multi-link device #1 on the link 1, and the station #101 in the multi-link device #1 returns a CTS frame to the station #201 in the multi-link device #2 on the link 1. In this way, the station #101 in the multi-link device #1 enables four spatial streams for receiving. Then, the station #201 sends data by using the four spatial streams for transmitting. Correspondingly, the station #101 receives data by using the four spatial streams for receiving.

Figure 8:
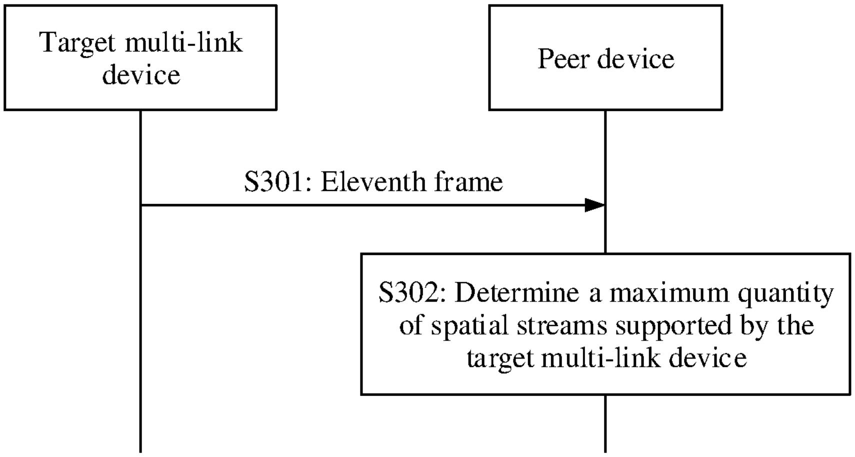
FIG. 8 is a flowchart of another data transmission method according to an embodiment of this application.

FIG. 8 shows a data transmission method according to an embodiment of this application. The method includes the following steps.

S301: A target multi-link device sends an eleventh frame to a peer device.

For example, the target multi-link device may be the first multi-link device or the second multi-link device.

Optionally, when the target multi-link device is an AP multi-link device, the AP multi-link device may send the eleventh frame in a unicast or broadcast manner.

Optionally, when the target multi-link device is a STA multi-link device, the STA multi-link device may send the eleventh frame in a unicast manner.

Optionally, the peer device may be a multi-link device or a single-link device.

For example, when the target multi-link device is the first multi-link device, step S201 may be specifically implemented as: A first station in the first multi-link device sends an eleventh frame to the peer device.

For another example, when the target multi-link device is the second multi-link device, step S201 may be specifically implemented as: A second station in the second multi-link device sends an eleventh frame to the peer device.

In this embodiment of this application, the eleventh frame indicates a maximum quantity (number of spatial steams, NSS) of spatial steams supported by the target multi-link device.

Optionally, a quantity of spatial steams is related to a modulation and demodulation scheme (modulation and coding scheme, MCS). Therefore, the eleventh frame specifically indicates a maximum quantity of spatial streams supported by the target multi-link device for each MCS.

Optionally, in this embodiment of this application, the maximum quantity of spatial streams may include a maximum quantity of spatial streams for transmitting and a maximum quantity of spatial streams for receiving.

For example, the eleventh frame may include a fifth field and a sixth field. The fifth field indicates a maximum quantity of spatial streams for receiving supported by the target multi-link device for each MCS. The sixth field indicates a maximum quantity of spatial streams for transmitting supported by the target multi-link device for each MCS.

Optionally, the fifth field may have another name, for example, a receive MCS mapping field. The sixth field may have another name, for example, a send MCS mapping field.

Figure 9:
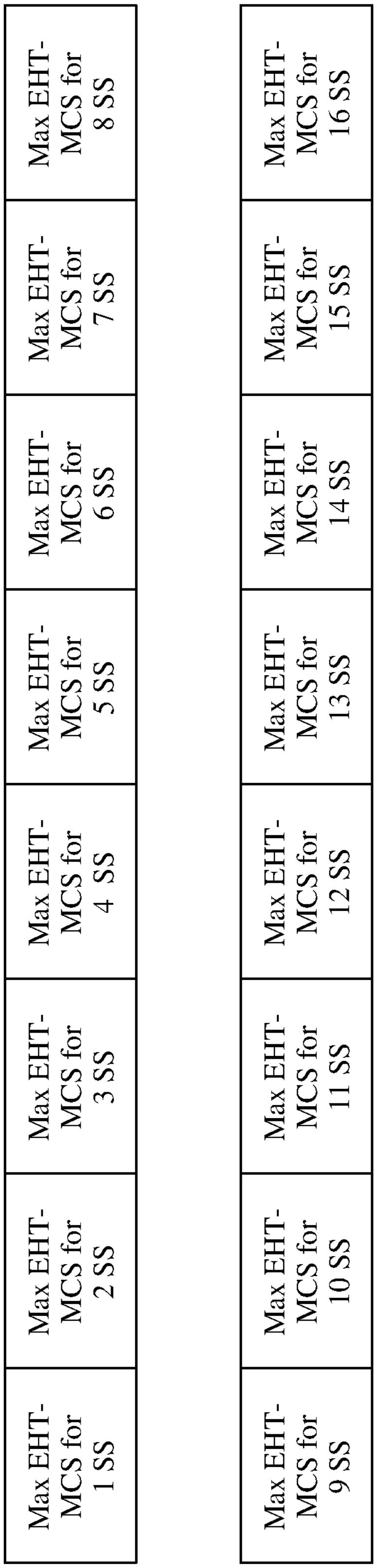
FIG. 9 is a schematic diagram of a format of a fifth field according to an embodiment of this application.

For a format of the fifth field, refer to FIG. 9. In FIG. 9, a Max EHT-MCS For n SS field occupies two bits. The Max EHT-MCS For n SS field corresponds to a quantity n of spatial streams for receiving, and n may be any integer from 1 to 16. An encoding rule of the Max EHT-MCS For n SS field is as follows.

(1) If a value of the Max EHT-MCS For n SS field is 0, it indicates that an EHT-MCS0-7 support n spatial streams for receiving.

(2) If a value of the Max EHT-MCS For n SS field is 1, it indicates that an EHT-MCS0-9 support the n spatial streams for receiving.

(3) If a value of the Max EHT-MCS For n SS field is 2, it indicates that an EHT-MCS0-11, an EHT-MCS0-13, or an EHT-MCS0-14 supports the n receive spatial streams.

(4) If a value of the Max EHT-MCS For n SS field is 3, it indicates that an EHT PPDU does not support the n spatial streams for receiving.

It should be noted that, for some specific quantities of spatial streams, an MCS supported by the Max EHT-MCS For n SS field may not be applied to all PPDU bandwidths.

In this embodiment of this application, for a specific implementation of the sixth field, refer to the fifth field. Details are not described herein again.

Optionally, the eleventh frame further indicates a maximum quantity of spatial streams supported by each station in the target multi-link device. For example, the maximum quantity of spatial streams supported by each station in the target multi-link device is a maximum quantity of spatial streams supported by the station in a default case. In a possible design, the eleventh frame may include an eighth field corresponding to each station in the target multi-link device. The eighth field indicates the maximum quantity of spatial streams supported by the station. The eighth field may include a field of a quantity of spatial streams for receiving, a field of a quantity of spatial streams for transmitting, and a link identifier field. The link identifier field in the eighth field is used for determining a station corresponding to the eighth field. The field of the quantity of spatial streams for receiving in the eighth field indicates a maximum quantity of spatial streams for receiving supported by the station. The field of the quantity of spatial streams for transmitting in the eighth field indicates a maximum quantity of spatial streams for transmitting supported by the station.

For example, the target multi-link device is the first multi-link device. In the eleventh frame, the field of the quantity of spatial streams for receiving in the eighth frame corresponding to the first station may indicate a value of N.

For example, the target multi-link device is the second multi-link device. In the eleventh frame, the field of the quantity of spatial streams for transmitting in the eighth frame corresponding to the first station may indicate a value of Q.

Optionally, in the eighth field, the field of the quantity of spatial streams for receiving (or the field of the quantity of spatial streams for transmitting) may indicate a maximum quantity of spatial streams for receiving (or a maximum quantity of spatial streams for transmitting) in a simple manner. For example, the field of the quantity of spatial streams for receiving is four bits, and each value of the four bits corresponds to one of the quantity of spatial streams for receiving 1 to 16.

Optionally, in the eighth field, for the field of the quantity of spatial streams for receiving and the field of the quantity of spatial streams for transmitting, refer to an implementation of the fifth field in FIG. 9.

Optionally, the eleventh frame further indicates a maximum quantity of spatial streams that can be used by each station in the target multi-link device. Because one station may use a spatial stream supported by a shared station, the maximum quantity of spatial streams that can be used by the station may be greater than or equal to a maximum quantity of spatial streams supported by the station. For example, to achieve this objective, the eleventh frame may further include a ninth field corresponding to each station in the target multi-link device. The ninth field indicates the maximum quantity of spatial streams that can be used by the station.

In a possible design, the ninth field may include a field of a quantity of spatial streams for receiving, a field of a quantity of spatial streams for transmitting, and a link identifier field. The link identifier field in the ninth field is used for determining a station corresponding to the ninth field. The field of the quantity of spatial streams for receiving in the ninth field indicates a maximum quantity of spatial streams for receiving that can be used by the station. The field of the quantity of spatial streams for transmitting in the ninth field indicates a maximum quantity of spatial streams for transmitting that can be used by the station.

For example, the target multi-link device is the first multi-link device. In the eleventh frame, the field of the quantity of spatial streams for receiving in the ninth field corresponding to the first station indicates a maximum value that can be reached by P.

For example, the target multi-link device is the second multi-link device. In the eleventh frame, the field of the quantity of spatial streams for transmitting in the ninth field corresponding to the first station indicates a maximum value that can be reached by L.

Optionally, in the ninth field, the field of the quantity of spatial streams for receiving (or the field of the quantity of spatial streams for transmitting) may indicate a maximum quantity of spatial streams for receiving (or a maximum quantity of spatial streams for transmitting) in a simple manner. For example, the field of the quantity of spatial streams for receiving is four bits, and each value of the four bits corresponds to one of the quantity of spatial streams for receiving 1 to 16.

Optionally, in the ninth field, for the field of the quantity of spatial streams for receiving and the field of the quantity of spatial streams for transmitting, refer to an implementation of the fifth field in FIG. 9.

Optionally, the eleventh frame may not explicitly indicate the maximum quantity of spatial streams that can be used by each station in the target multi-link device. That is, the eleventh frame may not include the ninth field.

For example, when the eleventh frame does not include the ninth field, if it is specified in a communication standard that a maximum quantity of spatial streams for receiving/a maximum quantity of spatial streams for transmitting supported by the target multi-link device has a unique value, a maximum quantity of spatial streams for receiving that can be used by each station in the target multi-link device is equal to a maximum quantity of spatial streams for receiving supported by the target multi-link device, and a maximum quantity of spatial streams for transmitting that can be used by each station in the target multi-link device is equal to a maximum quantity of spatial streams for transmitting supported by the target multi-link device. In this case, the maximum quantity of spatial streams for receiving supported by the target multi-link device is a sum of a quantity of spatial streams for receiving supported by all shared stations in the target multi-link device. The maximum quantity of spatial streams for transmitting supported by the target multi-link device is a sum of a quantity of spatial streams for transmitting supported by all the shared stations in the target multi-link device.

Optionally, the eleventh frame may include a shared station field. The shared station field may include a plurality of link identifier fields. Each link identifier field is corresponding to one station participating in a shared spatial stream in the target multi-link device.

In a possible design, when a maximum quantity of spatial streams supported by a multi-link device is extended from one to more, that is, it is allowed in the communication standard that the maximum quantity of spatial streams for receiving/a maximum quantity of spatial streams for transmitting supported by the target multi-link device have a plurality of values, the eleventh frame may include a plurality of set fields of a quantity of shared spatial streams for receiving and a plurality of set fields of a quantity of shared spatial streams.

A set field of the quantity of shared spatial streams for receiving includes a field of a quantity of spatial streams for receiving and one or more link identifier fields. The field of the quantity of spatial streams for receiving in the set field of the quantity of shared spatial streams for receiving indicates the maximum quantity of spatial streams for receiving supported by the target multi-link device. Each link identifier field in the set field of the quantity of shared spatial streams for receiving corresponds to one station participating in a shared spatial stream in the target multi-link device.

Based on this design, when the eleventh frame does not include the ninth field, a maximum quantity of spatial streams for receiving that can be used by one station in the target multi-link device is equal to a quantity of spatial streams for receiving corresponding to a set field of a quantity of shared spatial streams for receiving supported by the station.

A set field of a quantity of shared spatial streams for transmitting includes a field of a quantity of spatial streams for transmitting and one or more link identifier fields. The field of the quantity of spatial streams for transmitting in the set field of the quantity of shared spatial streams for transmitting indicates the maximum quantity of spatial streams for transmitting supported by the target multi-link device. Each link identifier field in the set field of the quantity of shared spatial streams for transmitting corresponds to one station participating in a shared spatial stream in the target multi-link device.

Based on this design, when the eleventh frame does not include the ninth field, a maximum spatial streams for transmitting that can be used by one station in the target multi-link device is equal to a quantity of spatial streams for transmitting corresponding to a set field of a quantity of shared spatial streams for transmitting supported by the station.

In this embodiment of this application, the eleventh frame may be a new type of a management frame. Alternatively, the eleventh frame may multiplex an existing management frame. For example, the eleventh frame may multiplex an association request/association response frame.

Optionally, when the eleventh frame multiplexes the association request/association response frame, the fifth field and the sixth field may be located in a supported EHT MCS and NSS set (Supported EHT MCS and NSS Set) field in a capability element carried in the association request/association response frame.

S302: The peer device determines the maximum quantity of spatial streams supported by the target multi-link device.

In this embodiment of this application, the peer device may determine the maximum quantity of spatial streams supported by the target multi-link device for each MCS based on the eleventh frame and an operating mode notification frame (or an operating mode (operating mode, OM) field).

For example, the peer device determines a quantity of first spatial streams and a quantity of second spatial streams corresponding to a target MCS. The quantity of first spatial streams is a maximum quantity of spatial streams for receiving supported by the target MCS indicated by a fourth field in a ninth frame. The quantity of second spatial streams is a maximum quantity of spatial streams for receiving indicated by a field of a quantity of spatial streams for receiving in a recently received operating mode notification frame or a recently received operating mode (operating mode, OM) field. The peer device uses a quantity of third spatial streams as a maximum quantity of spatial streams for receiving supported by the target multi-link device on the target MCS. The quantity of third spatial streams is a minimum value between the quantity of first spatial streams and the quantity of second spatial streams.

For example, the peer device determines a quantity of fourth spatial streams and a quantity of fifth spatial streams corresponding to the target MCS. The quantity of fourth spatial streams is a maximum quantity of spatial streams for transmitting supported by the target MCS indicated by a fifth field in the ninth frame. The quantity of fifth spatial streams is a maximum quantity of spatial streams for transmitting indicated by a field of a quantity of spatial streams for transmitting in the recently received operating mode notification frame or the recently received OM field. The peer device uses a quantity of sixth spatial streams as a maximum quantity of spatial streams for transmitting supported by the target multi-link device on the target MCS. The quantity of sixth spatial streams is a minimum value between the quantity of fourth spatial streams and the quantity of fifth spatial streams.

The target MCS may be any MCS.

Optionally, when the eleventh frame includes the eighth field corresponding to each station in the target multi-link device, the peer device may determine, based on the eleventh frame, a maximum quantity of spatial streams for receiving and a maximum quantity of spatial streams for transmitting that are supported by each station in the target multi-link device in a default case.

Optionally, when the eleventh frame includes the ninth field corresponding to each station in the target multi-link device, the peer device may determine, based on the eleventh frame, a maximum quantity of spatial streams for receiving and a maximum quantity of spatial streams for transmitting that are supported by each station in the target multi-link device when a shared spatial stream is used.

Based on the technical solution shown in FIG. 8, the target multi-link device sends the eleventh frame to the peer device, so that the peer device can determine the maximum quantity of spatial streams supported by the target multi-link device. Therefore, the peer device may communicate with the target multi-link device by using an appropriate quantity of spatial streams.

In the foregoing embodiment, the data may be replaced with a PPDU, a packet, a radio frame, or the like. This is not limited herein.

In the foregoing embodiment, a spatial stream supported by a station in the multi-link device refers to a spatial stream that can be received or sent by an antenna configured for the station.

In the foregoing embodiment, that a station in the multi-link device may use a spatial stream supported by another station means that the station may use an antenna configured for the another station to receive or send the spatial stream.

In the foregoing embodiment, the spatial stream for receiving may be replaced with a receive antenna or a receive channel. The spatial stream for transmitting may be replaced with a transmit antenna or a transmit channel.

In this embodiment of this application, names of frames (for example, the first frame and the second frame) and fields (for example, the first field and the second field) are examples. This is not specifically limited herein.

The foregoing mainly describes the solutions provided in embodiments of this application from a perspective of a communication apparatus (for example, the first multi-link device or the second multi-link device). It may be understood that, to implement the foregoing functions, the communication apparatus includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the apparatus may be divided into function modules based on the foregoing method examples. For example, each function module may be obtained through division based on each corresponding function, or two or more functions may be integrated into one function module. The integrated module may be implemented in a form of hardware, or may be implemented in a form of a software function module. Division into modules in embodiments of this application is an example, and is merely logical function division. During actual implementation, there may be another division manner. An example in which each function module is obtained through division based on each corresponding function is used below for description.

Figure 10:
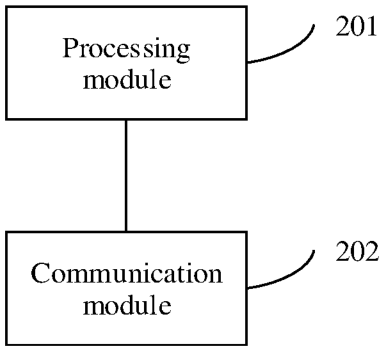
FIG. 10 is a schematic diagram of a structure of a communication apparatus according to an embodiment of this application.

FIG. 10 shows a communication apparatus according to an embodiment of this application. The communication apparatus includes a processing module 201 and a communication module 202.

The communication module 202 is configured to perform step S101 in FIG. 4, step S102 in FIG. 5, step S201 in FIG. 6, and step S301 in FIG. 8. The processing module 201 may be configured to perform step S302 in FIG. 8 to generate or parse data.

Figure 11:
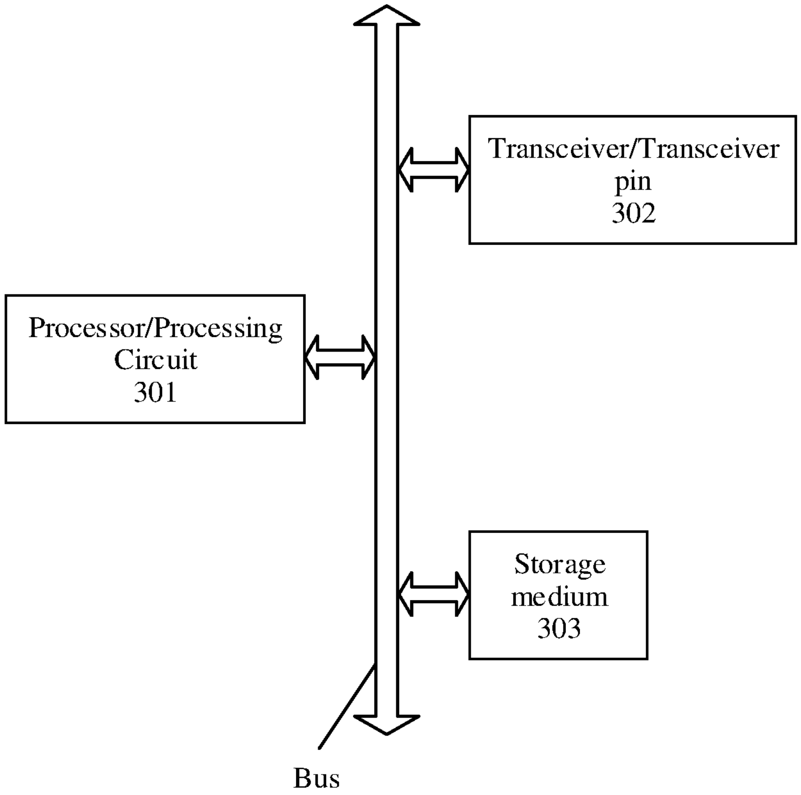
FIG. 11 is a schematic diagram of a structure of a communication apparatus according to an embodiment of this application.

FIG. 11 is a diagram of a structure of a possible product form of a communication apparatus according to an embodiment of this application.

In a possible product form, the communication apparatus in this embodiment of this application may be a communication device. The communication device includes a processor 301 and a transceiver 302. Optionally, the communication device further includes a storage medium 303.

The transceiver 302 is configured to perform step S101 in FIG. 4, step S102 in FIG. 5, step S201 in FIG. 6, and step S301 in FIG. 8. The processor 301 may be configured to perform step S302 in FIG. 8 to generate or parse data.

In another possible product form, the communication apparatus described in this embodiment of this application may alternatively be implemented by a general-purpose processor or a special-purpose processor that is commonly referred to as a chip. The chip includes a processing circuit 301 and a transceiver pin 302. Optionally, the chip may further include a storage medium 303.

In another possible product form, the communication apparatus described in this embodiment of this application may alternatively be implemented by using the following circuit or component: one or more field programmable gate arrays (field programmable gate array, FPGA), a programmable logic device (programmable logic device, PLD), a controller, a state machine, gate logic, a discrete hardware component, any other suitable circuits, or any combination of circuits that can perform various functions described in this application.

It should be understood that the computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk, or a magnetic tape), an optical medium, a semiconductor medium (for example, a solid-state drive), or the like.

Based on the foregoing descriptions of the implementations, a person skilled in the art may clearly understand that for the purpose of convenient and brief description, division into the foregoing function modules is merely used as an example for descriptions. During actual application, the foregoing functions can be allocated to different modules for implementation based on a requirement, that is, an inner structure of an apparatus is divided into different function modules to implement all or a part of the functions described above.

It should be understood that the apparatus and method disclosed in the several embodiments provided in this application may be implemented in other manners. For example, the described apparatus embodiments are merely examples. For example, the division into modules or units is merely logical function division, and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, in other words, may be located in one position, or may be distributed on a plurality of different positions. A part or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in embodiments of this application essentially, or the part contributing to the conventional art, or all or a part of the technical solutions may be implemented in the form of a software product. The software product is stored in a storage medium and includes several instructions for instructing a device (which may be a single-chip microcomputer, a chip or the like) or a processor (processor) to perform all or a part of the steps of the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, comprising:

sending, by a first station in a first multi-link device, a third frame, wherein the third frame indicates the first station enabled a sharing mode in which the first station is a shared station, the shared station shares spatial streams with another station in the first multi-link device, the sharing mode is used for enabling the first station to use the shared spatial streams for receiving or transmitting a physical layer protocol data unit (PPDU), and a quantity of the plurality of the shared spatial streams used by the first station is less than or equal to a maximum quantity of shared spatial streams supported by the first multi-link device, the third frame comprises a shared station field, and the shared station field indicates a plurality of stations in the sharing mode; and receiving, by the first station, a fourth frame, wherein the fourth frame is used for responding to the third frame.

2. The data transmission method according to claim 1, further comprising:

receiving, by the first station, a fifth frame, wherein the fifth frame indicates the first station to disable the sharing mode; and sending, by the first station, a sixth frame, wherein the sixth frame is used for responding to the fifth frame.

3. The data transmission method according to claim 1, wherein the third frame further comprises at least one of a first field or a second field, the first field indicates, for each modulation and coding scheme (MCS) among a plurality of MCSs, a maximum quantity of spatial streams for reception supported by the first multi-link device, and the second field indicates, for each MCS among the plurality of MCSs, a maximum quantity of spatial streams for transmitting supported by the first multi-link device.

4. The data transmission method according to claim 3, wherein the first field is carried in a Supported EHT MCS and NSS Set field of the third frame.

5. The data transmission method according to claim 3, wherein the second field is carried in a Supported EHT MCS and NSS Set field of the frame.

6. The data transmission method according to claim 1, wherein the shared station field comprises a plurality of link identifier fields indicating the plurality of stations in the sharing mode.

7. An apparatus, comprising:

at least one processor; and a memory having instructions stored thereon that, when executed by the at least one processor, cause the apparatus to:

cause a first station in a first multi-link device to send a third frame, wherein the third frame indicates the first station enabled a sharing mode in which the first station is a shared station, the shared station shares spatial streams with another station in the first multi-link device, the sharing mode is used for enabling the first station to use the shared spatial streams for receiving or transmitting a physical layer protocol data unit (PPDU), and a quantity of the plurality of the shared spatial streams used by the first station is less than or equal to a maximum quantity of shared spatial streams supported by the first multi-link device, the third frame comprises a shared station field, and the shared station field indicates a plurality of stations in the sharing mode; and receive a fourth frame, wherein the fourth frame is used for responding to the third frame.

8. The apparatus according to claim 7, wherein the apparatus is further caused to:

cause the first station to process a fifth frame, wherein the fifth frame indicates the first station to disable the sharing mode; and cause the first station to send a sixth frame, wherein the sixth frame is used for responding to the fifth frame.

9. The apparatus according to claim 7, wherein the third frame further comprises at least one of a first field or a second field, the first field indicates, for each modulation and coding scheme (MCS) among a plurality of MCSs, a maximum quantity of spatial streams for reception supported by the first multi-link device, and the second field indicates, for each MCS among the plurality of MCSs, a maximum quantity of spatial streams for transmitting supported by the first multi-link device.

10. The apparatus according to claim 9, wherein the first field is carried in a Supported EHT MCS and NSS Set field of the third frame.

11. The apparatus according to claim 9, wherein the second field is carried in a Supported EHT MCS and NSS Set field of the frame.

12. The apparatus according to claim 7, wherein the shared station field comprises a plurality of link identifier fields indicating the plurality of stations in the sharing mode.

13. A non-transitory computer-readable storage medium having instructions stored thereon that, when executed by a processor, cause an apparatus to:

cause a first station in a first multi-link device to send a third frame, wherein the third frame indicates the first station enabled a sharing mode in which the first station is a shared station, the shared station shares spatial streams with another station in the first multi-link device, the sharing mode is used for enabling the first station to use the shared spatial streams for receiving or transmitting a physical layer protocol data unit (PPDU), and a quantity of the plurality of the shared spatial streams used by the first station is less than or equal to a maximum quantity of shared spatial streams supported by the first multi-link device, the third frame comprises a shared station field, and the shared station field indicates a plurality of stations in the sharing mode; and receive a fourth frame, wherein the fourth frame is used for responding to the third frame.

14. The non-transitory computer-readable storage medium according to claim 13, wherein the third frame further comprises at least one of a first field or a second field, the first field indicates, for each modulation and coding scheme (MCS) among a plurality of MCSs, a maximum quantity of spatial streams for reception supported by the first multi-link device, and the second field indicates, for each MCS among the plurality of MCSs, a maximum quantity of spatial streams for transmitting supported by the first multi-link device.

15. The non-transitory computer-readable storage medium according to claim 14, wherein the first field is carried in a Supported EHT MCS and NSS Set field of the third frame.

16. The non-transitory computer-readable storage medium according to claim 14, wherein the second field is carried in a Supported EHT MCS and NSS Set field of the frame.

17. The non-transitory computer-readable storage medium according to claim 13, wherein the shared station field comprises a plurality of link identifier fields indicating the plurality of stations in the sharing mode.

* * * * *